(12) United States Patent
Hedley et al.

(10) Patent No.: US 10,440,678 B2
(45) Date of Patent: Oct. 8, 2019

(54) ESTIMATING LOCATIONS OF MOBILE DEVICES IN A WIRELESS TRACKING SYSTEM

(71) Applicant: Commonwealth Scientific and Industrial Research Organisation, Acton (AU)

(72) Inventors: Mark Hedley, Acton (AU); Shenghong Li, Acton (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 0 days.

(21) Appl. No.: 16/084,841

(22) PCT Filed: Mar. 10, 2017

(86) PCT No.: PCT/AU2017/050220
§ 371 (c)(1),
(2) Date: Sep. 13, 2018

(87) PCT Pub. No.: WO2017/156574
PCT Pub. Date: Sep. 21, 2017

(65) Prior Publication Data
US 2019/0104493 A1    Apr. 4, 2019

(30) Foreign Application Priority Data

Mar. 14, 2016  (AU) ................................ 2016900950

(51) Int. Cl.
*H04W 24/00*    (2009.01)
*H04W 64/00*    (2009.01)
(Continued)

(52) U.S. Cl.
CPC .............. *H04W 64/003* (2013.01); *G01S 5/00* (2013.01); *G01S 5/02* (2013.01); *G01S 5/0205* (2013.01);
(Continued)

(58) Field of Classification Search
CPC ..... H04W 4/027; H04W 4/046; H04W 28/04; H04W 4/029; H04W 4/12; H04W 4/50; H04W 4/90; H04W 64/00; H04W 76/50

USPC ... 455/456.4, 456.1, 465, 456.2, 456.5, 558, 455/422.1, 80, 446
See application file for complete search history.

(56) References Cited

U.S. PATENT DOCUMENTS 8,994,591 B2 *  3/2015  Dupray ............... G01C 21/206
                                                    342/457
2014/0274151 A1  9/2014  Pattabiraman et al.
(Continued)

OTHER PUBLICATIONS

Raitoharju, Kalman filter with a linear state model for PDR+WLAN positioning and its application to assisting a particle filter Tampere University of Technology, 2015.*
(Continued)

*Primary Examiner* — Joseph Arevalo
(74) *Attorney, Agent, or Firm* — Brinks Gilson & Lione

(57) ABSTRACT

A wireless tracking system comprises mobile devices and stationary devices at known locations. The system receives a first radio measurement indicative of a first propagation path length and receives sensor data indicative of the movement of the first mobile device. The sensor data is of a type different to the radio measurement. The system then determines a historical location of the first mobile device based on the first radio measurement and the sensor data and determines error data indicative of a difference between a historical radio measurement and the historical location and stores the error data associated with the historical location. The system can then receive a second radio measurement indicative of a second propagation path length of radio frequency radiation and determine an estimated location of the second mobile device based on the second radio measurement and the stored error data.

20 Claims, 18 Drawing Sheets

(51) Int. Cl.
  *G01S 5/00*    (2006.01)
  *G01S 5/02*    (2010.01)
  *H04W 4/33*    (2018.01)
  *H04W 4/029*   (2018.01)
  *H04W 4/02*    (2018.01)
  *H04W 24/10*   (2009.01)

(52) U.S. Cl.
  CPC .......... *G01S 5/0263* (2013.01); *G01S 5/0273* (2013.01); *G01S 5/0294* (2013.01); *H04W 4/027* (2013.01); *H04W 4/029* (2018.02); *H04W 4/33* (2018.02); *H04W 24/10* (2013.01); *H04W 64/00* (2013.01)

(56) References Cited

U.S. PATENT DOCUMENTS

| | | | |
|---|---|---|---|
| 2016/0006476 A1* | 1/2016 | El-Rayis | H04W 4/70 455/78 |
| 2016/0066157 A1 | 3/2016 | Noorshams et al. | |
| 2018/0032997 A1* | 2/2018 | Gordon | G06Q 20/3224 |

OTHER PUBLICATIONS

International Preliminary Report on Patentability for corresponding PCT International application No. PCT/AU2017/050220, dated Jul. 18, 2018.

Written Opinion of the International Preliminary Examining Authority for corresponding PCT International application No. PCT/AU2017/050220, dated Feb. 1, 2018.

Written Opinion of the International Searching Authority for corresponding PCT International application No. PCT/AU2017/050220, dated Jun. 7, 2017.

* cited by examiner

Algorithm 1 Integrated INS/IPS based on KF.

Initialization: Set $k = 0$. Initialize the INS states ($\hat{C}^N_{B,k}$, $\hat{v}^N_k$, $\hat{r}^N_k$, $\hat{b}^B_{\omega,k}$, and $\hat{b}^B_{a,k}$) and the error covariance matrix $P_k$.

Repeat:
1) INS state calculation according to (6)-(13).
2) KF prediction according to (16)-(19), set $$P_{k+1} = A_k P_k A_k^T + B_k Q_w B_k^T. \qquad (22)$$

where $Q_w \triangleq E[w_k w_k^T]$.
3) Set $k = k + 1$.
4) If measurement input (21) is available
   a) KF updating:

$$S_k = H_k P_k H_k^T - R_k. \qquad (23)$$
$$K_k = P_k H_k^T S_k^{-1}. \qquad (24)$$
$$\delta x_k = K_k y_k. \qquad (25)$$
$$P_k = (I - K_k H_k) P_k. \qquad (26)$$

where $R_k \triangleq E(\xi_k \xi_k^T)$.
   b) Correct INS states according to (14)-(15).
   c) Reset $\delta x_k$ to zero.

Fig. 19

Algorithm 2 Proposed data fusion scheme for integrated INS/IPS with non-Gaussian ranging error distributions.

Initialization: Set $\mu_{k|k-1} = \hat{r}_k^N$, $\Sigma_{k|k-1} = [P_k]_{(7:9,7:9)}$; set $\hat{\mu}_{k|k} = \mu_{k|k-1}$, $\hat{\Sigma}_{k|k} = \Sigma_{k|k-1}$.

Start:

1) Repeat:
   a) Randomly draw $N$ samples $x[n]$, ($n = 1, \ldots, N$) according to $\mathcal{N}(\hat{\mu}_{k|k}, \hat{\Sigma}_{k|k})$; set $q[n] = \mathcal{N}(x[n]; \hat{\mu}_{k|k}, \hat{\Sigma}_{k|k})$.
   b) Set $$w[n] = \frac{1}{q[n]} \mathcal{N}(x[n]; \mu_{k|k-1}, \Sigma_{k|k-1}) \times \prod_{i=1}^{L} p_{k,i}(\tilde{d}_{k,i} - |x[n] - r_i|). \quad (31)$$

where $p_{k,i}(\cdot)$ denotes the distribution of the ranging error $\xi_{k,i}$ (see (20)).

c) Set $\hat{\mu}_{\text{Prev}} = \hat{\mu}_{k|k}$.

$$\hat{\mu}_{k|k} = \sum_{n=1}^{N} w[n] x[n], \quad (32)$$

$$\hat{\Sigma}_{k|k} = \frac{\sum_{n=1}^{N} w[n](x[n] - \hat{\mu}_{k|k})(x[n] - \hat{\mu}_{k|k})^T}{1 - \sum_{n=1}^{N} w[n]^2}. \quad (33)$$

Until: $|\hat{\mu}_{k|k} - \hat{\mu}_{\text{Prev}}| < 0.01$.

2) Set $$\hat{R}_k = (\hat{\Sigma}_{k|k}^{-1} - \Sigma_{k|k-1}^{-1})^{-1}, \quad (34)$$

$$\hat{z}_k = \hat{R}_k(\hat{\Sigma}_{k|k}^{-1}\hat{\mu}_{k|k} - \Sigma_{k|k-1}^{-1}\mu_{k|k-1}). \quad (35)$$

Output: An observation model as (21), where $y_k = \hat{r}_k^N - \hat{z}_k$, $H_k = [0_{3 \times 6} \; I_3 \; 0_{3 \times 6}]$, the covariance of observation error is $E(\xi_k \xi_k^T) = \hat{R}_k$.

Fig. 20

Algorithm 3 Online learning of the location-dependent ranging error model.

Initialization: Set $M = 0$, $\{\chi_m\} = \emptyset$.

Repeat for each time step $k$:

Input: Estimated position $\hat{r}_k^N$, range measurements $\tilde{d}_{k,i}$.

1) Set $n = \arg\min_m |\hat{r}_k^N - \chi_m|$.
2) If $|\hat{r}_k^N - \chi_n^N| > d_{\text{TH}}$
   a) Set $M = M + 1$, $m = M$.
   b) Set $\chi_m = \hat{r}_k^N$; set $N_{m,i} = 0$, $b_{m,i} = 0$, $\lambda_{m,i} = 0$ for $i = 1, \ldots, A$.
   c) For all $i$ such that $d_{k,i}$ is available
      Set $b_{m,i} = d_{k,i} - |\hat{r}_k^N - r_i|$, $N_{m,i} = 1$.
3) Else
   For all $i$ such that $d_{k,i}$ is available
   a) Set $c = d_{k,i} - |\hat{r}_k^N - r_i|$.
   b) Set
   $$b_{m,i} = \frac{N_{m,i} b_{m,i} - c}{N_{m,i} + 1}. \quad (39)$$
   $$\lambda_{m,i} = \frac{N_{m,i} \lambda_{m,i} + |c - b_{m,i}|}{N_{m,i} - 1}. \quad (40)$$
   c) Set $N_{m,i} = N_{m,i} - 1$.

Output: $\{\chi_m, \{b_{m,i}\}_{i=1}^A, \{\lambda_{m,i}\}_{i=1}^A\}_{m=1}^M$.

Fig. 21

Algorithm 4 Operation of the proposed self-calibrating indoor positioning system.

Initialization: Set $k = 1$. Initialize the INS states ($\hat{C}_{B,k}^N$, $\hat{v}_k^N$, $\hat{r}_k^N$, $\hat{b}_{\omega,k}^B$, and $\hat{b}_{a,k}^B$) and the error covariance $P_k$. Set $\delta x_l = 0$, $r_l = 0$, $\Sigma_{l,l} = 0$, $\Sigma_{l,0} = 0$, ($l = 1, \ldots, D + 1$), where $D$ denotes the lag of the BMFLS.

Repeat:

1) Update the augmented state in BMFLS. Set $r_{l+1} = r_l$, ($l = D, \ldots, 0$), $r_0 = \hat{r}_k^N$. Set $\Sigma_{0,0} = P_k$.
2) Generate an observation model as (21) using Algorithm 2 and the ranging error model given by (37)-(38).
3) KF updating:

$$S = H_k P_k H_k^T - R_k. \quad (41)$$
$$K = P_k H_k^T S^{-1}. \quad (42)$$
$$\delta x = K y_k. \quad (43)$$
$$P_k = (I - K H_k) P_k. \quad (44)$$

4) Correct INS states with $\delta x$ according to (14)-(15), output the realtime position estimate $\hat{r}_k^N$.
5) INS calculation and KF prediction:
   Set $k_{next} = k + T$, $F = I$.
   While $k \leq k_{next}$
   a) Calculate INS states according to (6)-(13).
   b) KF prediction according to (16)-(19), set $$P_{k+1} = A_k P_k A_k^T + B_k Q_w B_k^T. \quad (45)$$

c) Set $F = A_k F$.
   d) $k = k + 1$.
6) BMFLS updating:
   Set $L_0 = FK$, $\delta x_0 = 0$.
   For $l = D - 1, \ldots, 1$ $$L = \Sigma_{l-1,0} H_k^T S^{-1}. \quad (46)$$
   $$\delta x_l = \delta x_{l-1} - L y_k. \quad (47)$$
   $$\Sigma_{l,l} = \Sigma_{l-1,l-1} - \Sigma_{l-1,0} H_k^T L^T. \quad (48)$$
   $$\Sigma_{l,0} = \Sigma_{l-1,0} (F - L_0 H_k)^T. \quad (49)$$

7) Output the delayed position estimate $\hat{r}_{k-DT}^N = r_{D+1} - [\delta x_{D+1}]_{7:9}$.
8) Use $\hat{r}_{k-DT}^N$ in Algorithm 3 for learning the location-dependent ranging error model.

Fig. 22

ESTIMATING LOCATIONS OF MOBILE DEVICES IN A WIRELESS TRACKING SYSTEM

CROSS-REFERENCE TO RELATED APPLICATIONS

The present application is the U.S. National Stage application of PCT Application No. PCT/AU2017/050220, filed on Mar. 10, 2017, designating the United States, which claims priority to Australian Provisional Patent Application 2016900950, filed Mar. 14, 2016, of which the contents of all such applications are incorporated herein by reference.

TECHNICAL FIELD

This disclosure relates to determining an estimated location of a mobile device in a wireless tracking system based on the propagation path length of radio frequency radiation. For example, but not limited to, this disclosure relates to methods and systems for determining an estimated location of a mobile device in a wireless tracking system.

BACKGROUND

Accurate location estimates become more important as an increasing number of mobile devices populate our environment. For example, autonomous devices, such as autonomous vacuum cleaners, warehouse robots, drones and the like use their current location estimate to perform their tasks efficiently and without causing accidents.

One widely used solution for determining an accurate location estimate is the Global Positioning System (GPS). GPS uses satellites and determines the current location using propagation times from known satellite positions. However, the satellite signals are absorbed by building structures and therefore, the accuracy of GPS is limited, if at all possible, indoors and in narrow streets with high buildings where most satellites are obscured.

As an alternative to using satellite signals, mobile devices can use radio frequency radiation from stationary devices, such as fixed location Wi-Fi hotspots. The mobile devices can determine the propagation time from the fixed location and calculate a location estimate.

FIG. 1 illustrates a prior art system 100 comprising a mobile device 101, a first stationary device 102 and a second stationary device 103. Mobile device 101 receives radio frequency (RF) radiation from first stationary device 102 and determines a propagation time of the radiation from the stationary device 102. Using the speed of light of 300,000 km/s as the propagation velocity, the mobile device 101 determines a first distance 104 from the first stationary device 102. As a result, the location estimate of mobile device 101 is somewhere on a first circle 105 with its radius being the calculated distance 104 from the first stationary device 102. The centre of the first circle 105 is the location of first stationary device 102, which may be retrieved from a lookup table using the frequency or signature data of the RF radiation.

Similarly, mobile device 101 receives RF radiation from second stationary device 103 and determines a second distance 106 from second stationary device 103. The estimated location is somewhere on a second circle 107 around second stationary device 103 with its radius being the calculated second distance 106 from the second stationary device 103. The mobile device can then calculate the location estimate as the intersection 108 of the first circle 105 and the second circle 107. While system 100 provides a good accuracy of the estimated location 108, the calculations rely on direct line of sight propagation of the RF radiation.

FIG. 2 illustrates an indoor scenario 200 comprising again a mobile device 201, a first stationary device 202 and a second stationary device 203. Mobile device 201 calculates the distance 204 from the first stationary device 202 to define a first circle 205. In contrast to FIG. 1, the indoor scenario 200 comprises first obstacle 206 and second obstacle 207. First obstacle 206 absorbs RF radiation such that the signal received by mobile device 201 from second stationary device 203 directly, that is, through obstacle 206, is attenuated to a level near or below the level of noise. As a result, mobile device 201 does not detect the received radiation as a useful signal. Instead, second obstacle 207 reflects the RF radiation and the reflected radiation reaches mobile device 201. This is referred to as "non-line-of-sight" (NLOS) propagation. Mobile device 201 detects the RF radiation and determines that the RF radiation originated from the second stationary device 203, such as by querying a lookup table for the detected frequency or data signature.

It is practically impossible for mobile device 201 to find out whether the received RF radiation has been reflected or received directly. Therefore, mobile device 201 calculates a distance 208 to second mobile device 203 which is the length of the propagation path and longer than the direct distance. As a result, intersecting the first circle 205 with a second circle 209 having the NLOS distance 208 as its radius results in a location estimate 209 that is inaccurate.

FIG. 3 illustrates another scenario 300 where the mobile device moves along a straight travel path as indicated by a solid line 301. The mobile device detects RF radiation from stationary device 302 and calculates the current location estimate as described above. An obstacle 303 blocks the line-of-sight RF radiation propagation 304 and 305 for a section of the travel path 301 but allows the RF radiation to propagate around its edges as indicated at 306 and 307. The solid dots, such as example dot 308, indicate the location estimates. As the path 301 continues under the obstacle 303 from left to right, the location estimate becomes increasingly inaccurate. In this case, the inaccuracy basically follows a cosine function and returns back to good accuracy when the mobile device receives radiation in the line of light 305.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

There is provided a method for determining an estimated location of a mobile device in a wireless tracking system. The wireless tracking system comprises a first mobile device, a second mobile device and multiple stationary devices at known locations. The method comprises:

receiving a first radio measurement indicative of a first propagation path length of radio frequency radiation between the first mobile device and the multiple stationary devices;

receiving sensor data indicative of the movement of the first mobile device, wherein the sensor data is of a type different to the radio measurement;

determining a historical location of the first mobile device based on the first radio measurement and the sensor data;

determining error data indicative of a difference between a historical radio measurement associated with the historical location and the historical location;

storing the error data associated with the historical location on a data store;

receiving a second radio measurement indicative of a second propagation path length of radio frequency radiation between a second mobile device and the multiple stationary devices; and determining an estimated location of the second mobile device based on the second radio measurement and the stored error data.

The advantage of using radio frequency (RF) radiation is that relatively inexpensive transceivers, such as Wi-Fi routers, are available. Further, RF radiations propagates well in a wide range of practical scenarios including indoor scenarios. However building structures and other obstacles reflect RF radiation, which leads to longer travel paths. As a result, a location determined based on propagation time is subject to errors that are difficult to model statistically. Storing error data determined based on propagation path length and sensor data has the advantage that the stored error data can be used by other mobile devices to compensate for errors caused by reflection of RF radiation. The resulting advantage is a more accurate location.

The data store may be part of the first mobile device or part of the second mobile device. The data store may be part of a server or other network accessible storage, such as cloud storage.

Receiving sensor data may comprise receiving sensor data from one or more inertial sensors. It is an advantage that inertial sensors are relatively inexpensive and provide high short-term accuracy.

Receiving the sensor data may comprise receiving sensor data from one or more of:
 a video camera;
 a laser range finder; and
 a radar.

Determining the historical location data comprises using a smoother. The smoother may be one or more of:
 a Bayesian smoother;
 a fixed length smoother;
 a Rauch-Tung-Striebel smoother; and
 a particle filter.

The first radio measurement and the sensor data may be associated with time t, the historical location may be associated with t' and t' may be earlier than t.

Determining the historical location may be based on further radio measurements and further sensor data associated with t" and t" is earlier than t'.

Determining the estimated location of the second mobile device based on the stored error data may comprise querying the stored error data for a query location to retrieve the error value associated with the query location. By utilising previously learned error values, the location estimate can be improved for subsequent nodes (or the same node) revisiting a previously visited region.

The error data may be indicative of a range offset to one of the multiple stationary devices. The error data may be indicative of an offset of the position of the second mobile device.

The error data may comprise parameters of a parameterised representation of the error data over a space in which the first mobile device and second mobile device are located. It is an advantage that a parameterised representation can provide the correction data in a more compact form, which results in reduced storage requirements and/or higher spatial resolution. The parameterised representation may be continuous or discrete.

A sampling rate of the historical locations is less than a sampling rate of the sensor data. It is an advantage that the sampling rate of the historical locations can be reduced to reduce the computational complexity without significantly reducing the accuracy of the determined location of the second mobile device. The sampling rate of the historical locations may be less than the sampling rate of the sensor data by a factor of $1/10$ or less.

Software, when executed by a computer, causes the computer to perform the above method.

There is provided a system for determining an estimated location of a mobile device in a wireless tracking system. The wireless tracking system comprises a first mobile device, a second mobile device and multiple stationary devices at known locations. The system comprises:
 an input port
  to receive a first radio measurement indicative of a first propagation path length of radio frequency radiation between the first mobile device and the multiple stationary devices, and
  to receive sensor data indicative of the movement of the first mobile device, wherein the sensor data is of a type different to the radio measurement; and
 a processor
  to determine a historical location of the first mobile device based on the first radio measurement and the sensor data,
  to determine error data indicative of a difference between a historical radio measurement associated with the historical location and the historical location,
  to store the error data associated with the historical location on a data store,
  to receive a second radio measurement indicative of a second propagation path length of radio frequency radiation between a second mobile device and the multiple stationary devices, and
  to determine an estimated location of the second mobile device based on the second radio measurement and the stored error data.

There is provided a method for determining an estimated location of a mobile device as performed by a location server in a wireless tracking system. The wireless tracking system comprises a first mobile device, a second mobile device and multiple stationary devices at known locations. The method comprises:

receiving a first radio measurement indicative of a first propagation path length of radio frequency radiation between the first mobile device and the multiple stationary devices;

receiving sensor data indicative of the movement of the first mobile device, wherein the sensor data is of a type different to the radio measurement;

determining a historical location of the first mobile device based on the first radio measurement and the sensor data;

determining error data indicative of a difference between a historical radio measurement associated with the historical location and the historical location;

sending the error data associated with the historical location to a second mobile device to allow the second mobile device to determine an estimated location of the second mobile device based on the error data and a second radio measurement indicative of a second propagation path length of radio frequency radiation between the second mobile device and the multiple stationary devices.

Software that, when executed by a location server, causes the location server to perform the above method.

There is provided a location server for determining an estimated location of a mobile device in a wireless tracking system. The wireless tracking system comprises a first mobile device, a second mobile device and multiple stationary devices at known locations. The location server comprises:

an input port
- to receive a first radio measurement indicative of a first propagation path length of radio frequency radiation between the first mobile device and the multiple stationary devices, and
- to receive sensor data indicative of the movement of the first mobile device, wherein the sensor data is of a type different to the radio measurement;

a processor
- to determine a historical location of the first mobile device based on the first radio measurement and the sensor data,
- to determine error data indicative of a difference between a historical radio measurement associated with the historical location and the historical location; and an output port to send the error data associated with the historical location to a second mobile device to allow the second mobile device to determine an estimated location of the second mobile device based on the error data and a second radio measurement indicative of a second propagation path length of radio frequency radiation between the second mobile device and the multiple stationary devices.

There is provided a method for determining an estimated location of a second mobile device as performed by the second mobile device in a wireless tracking system. The wireless tracking system comprises a first mobile device, the second mobile device and multiple stationary devices at known locations. The method comprises:

receiving error data associated with a historical location of a first device, the error data being indicative of a difference between a historical radio measurement associated with the historical location indicative of a first propagation path length of radio frequency radiation between the first mobile device and the multiple stationary devices and the historical location of the first mobile device determined based on the first radio measurement and sensor data indicative of the movement of the first mobile device, wherein the sensor data is of a type different to the radio measurement;

receiving a second radio measurement indicative of a second propagation path length of radio frequency radiation between a second mobile device and the multiple stationary devices; and determining an estimated location of the second mobile device based on the second radio measurement and the received error data.

Software, when executed by a mobile device, causes the mobile device to perform the above method.

There is provided a second mobile device for determining an estimated location of the second mobile device in a wireless tracking system. The wireless tracking system comprises a first mobile device, the second mobile device and multiple stationary devices at known locations. The second mobile device comprises:

a first input port to receive error data associated with a historical location of a first device, the error data being indicative of a difference between a historical radio measurement associated with the historical location indicative of a first propagation path length of radio frequency radiation between the first mobile device and the multiple stationary devices and the historical location of the first mobile device determined based on the first radio measurement and sensor data indicative of the movement of the first mobile device, wherein the sensor data is of a type different to the radio measurement;

a second input port to receive a second radio measurement indicative of a second propagation path length of radio frequency radiation between a second mobile device and the multiple stationary devices; and a processor to determine an estimated location of the second mobile device based on the second radio measurement and the received error data.

A mobile device is a device that changes location, such as a mobile phone, tablet computer, drone or robot. The mobile device may be autonomous, remote controlled, or carried by a user. The mobile device may be mounted on a working device such that the position of the mobile device is identical or in a fixed relationship to the position of the working device. Unless noted otherwise, the terms 'location' and 'position' are used interchangeably.

Receiving a radio measurement may comprise receiving the radio frequency radiation or may comprise receiving a value in the form of digital data transferred over a data network, for example. The data transfer may occur over the same wireless network that is used to locate the mobile device.

A radio measurement indicative of a propagation path length of radio frequency radiation between the mobile device and the multiple stationary devices may be any measurement or value that depends on or is derived from the propagation path length, such as the propagation time or signal strength. This includes the propagation time itself, such as a number value indicating the number of nanoseconds or signal strength or attenuation. The radio measurement may further be a calculated length of a propagation path that may be used as a distance from the stationary device. It is noted that this distance may not be the direct distance but around corners and other obstacles. The radio measurement may also be the location of the mobile device calculated from a measured propagation time. The location may be in x,y,z coordinates or in latitude, longitude and altitude. The location may also be a label, such as a room or floor number. The device that receives the radio measurement may have access to a source signal strength free-space attenuation per unit distance, such as per meter, in order to determine a propagation path length based on the received signal strength.

Receiving sensor data comprises capturing the sensor data from the sensor directly or receiving the data through a data network. The sensor may also pre-process the sensor data, such as by filtering noise before sending the sensor data.

Sensor data indicative of movement of a mobile device may comprise acceleration data, such as captured by an inertial sensor, absolute location data at multiple times or locations or any other sensor data that represent the movement of the mobile device. It is noted that the sensor may be located externally to the mobile device. Sensor data that is of a type different to the radio measurement data means that a longer propagation path of the radiation due to obstacles does not cause a change in the sensor data. Sensors configured to provide sensor data that is of a different type to the radio measurement data are also referred to as "complementary sensors" herein.

Historical locations may comprise one or more locations of the mobile device in the past or other data that can be used to derive the location of the device in the past. For example, historical locations may comprise the propagation time or the estimated distance to the stationary devices. It is noted that multiple propagation times or estimated distance values are used to determine a single location value. A historical radio measurement associated with the historical location may be a historical radio measurement that was measured at the same time as when the mobile device was (or is assumed to have been) at the historical location. "At the same time" means that the time between the two is insignificantly small, such as less that the sampling time.

Error data indicative of a difference between the first radio measurement and the historical location may be the explicit difference in location determined by subtracting the location derived from the radio measurement from the historical location. The error data may also be more implicitly related to that difference, such as a difference in propagation times or estimated distances from stationary nodes from expected propagation times or distances given the historical location data. In cases where the historical location data comprises historical propagation times or distances, the error data may be the explicit difference between the historical values and the values from the radio measurement.

Storing the error data associated with the historical location data on a data store comprises storing any values that represent the actual error. This includes the calculated differences as mentioned above as well as parameters of a linear, polynomial, spline or other parameterised representation.

Optional features described of any aspect of method, software, computer readable medium or computer system, where appropriate, similarly apply to the other aspects also described here.

Figure 4:
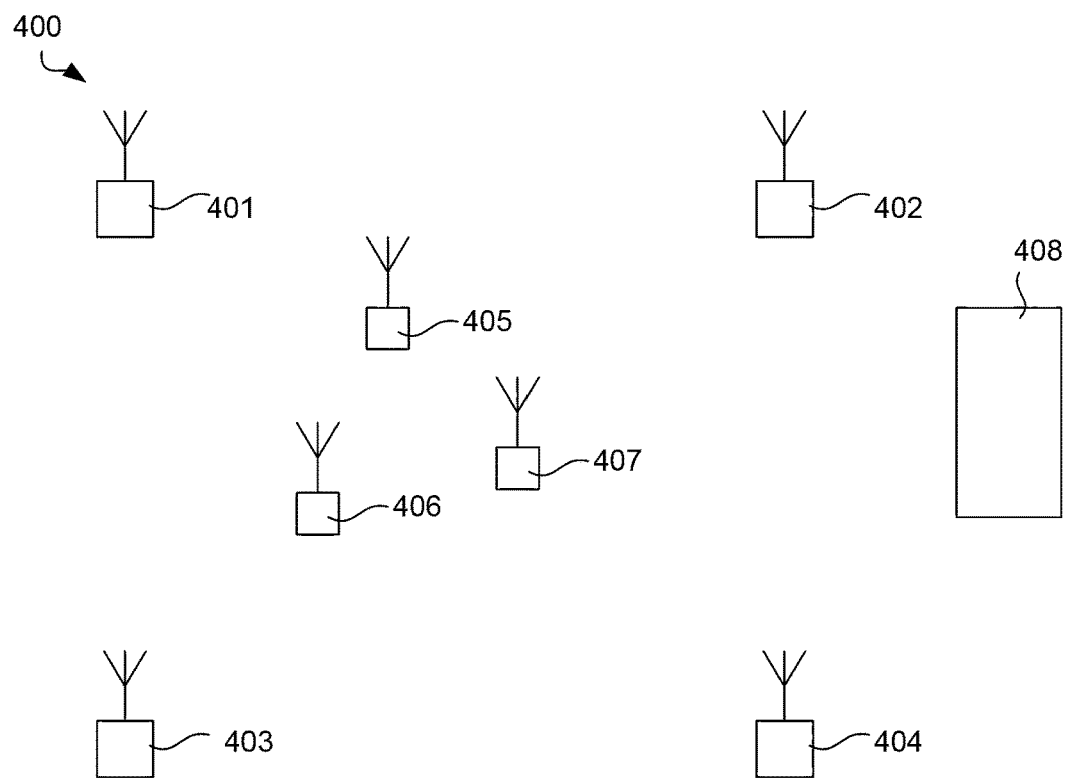

An example will now be described with reference to:

FIG. 4 shows a system for determining an estimated location of a mobile device.

Figure 5:
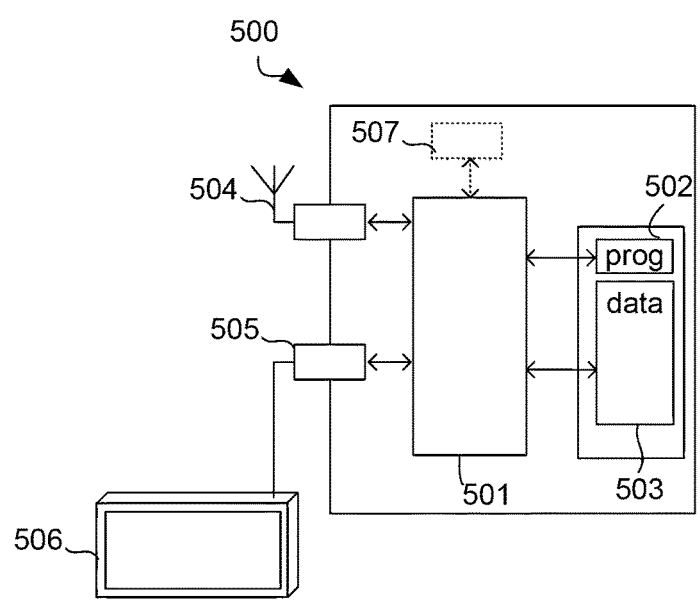

FIG. 5 illustrates a computer system for determining an estimated location of a mobile device in more detail.

Figure 6:
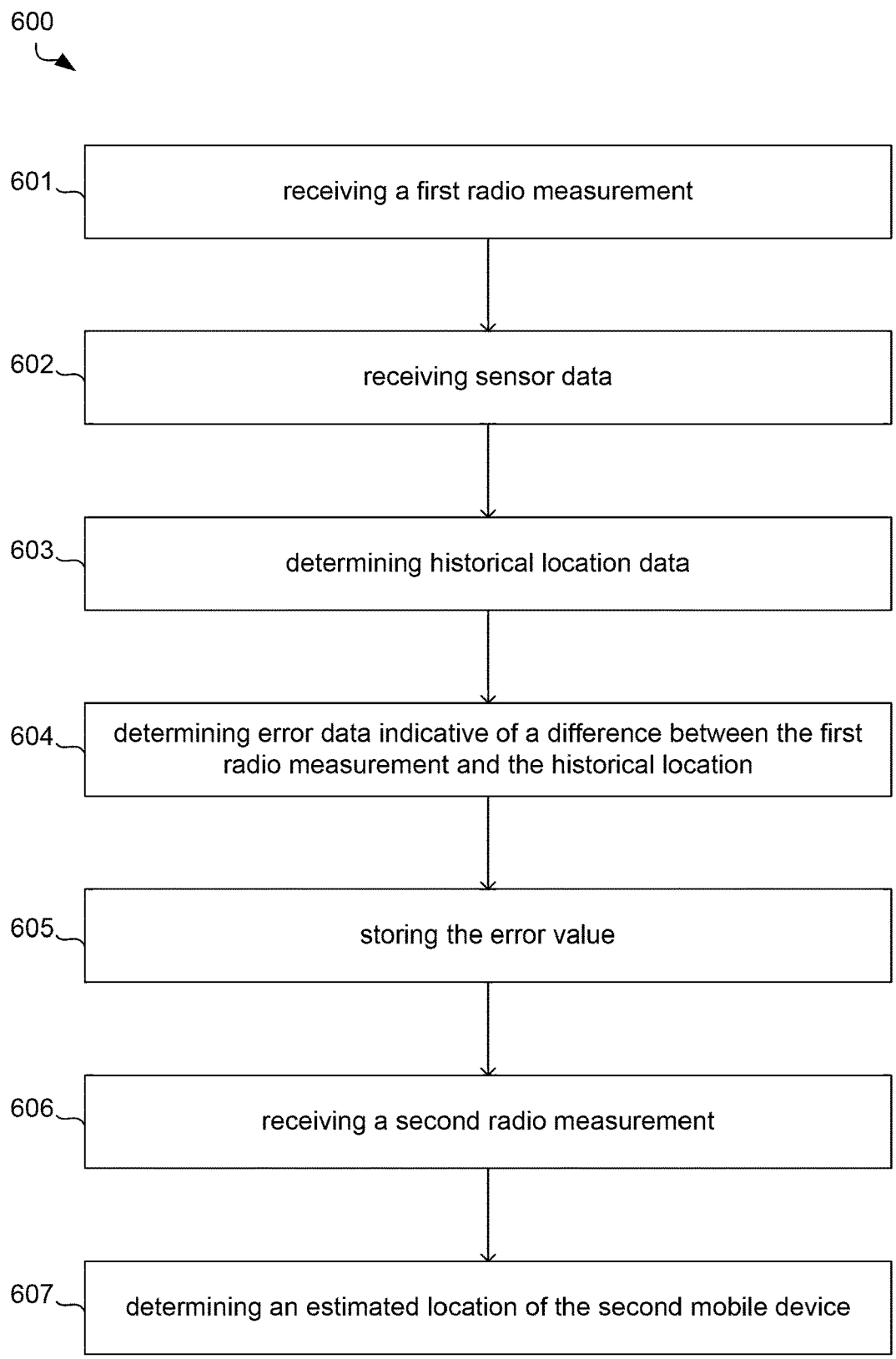

FIG. 6 illustrates a method for determining an estimated location of a mobile device.

Figure 7:
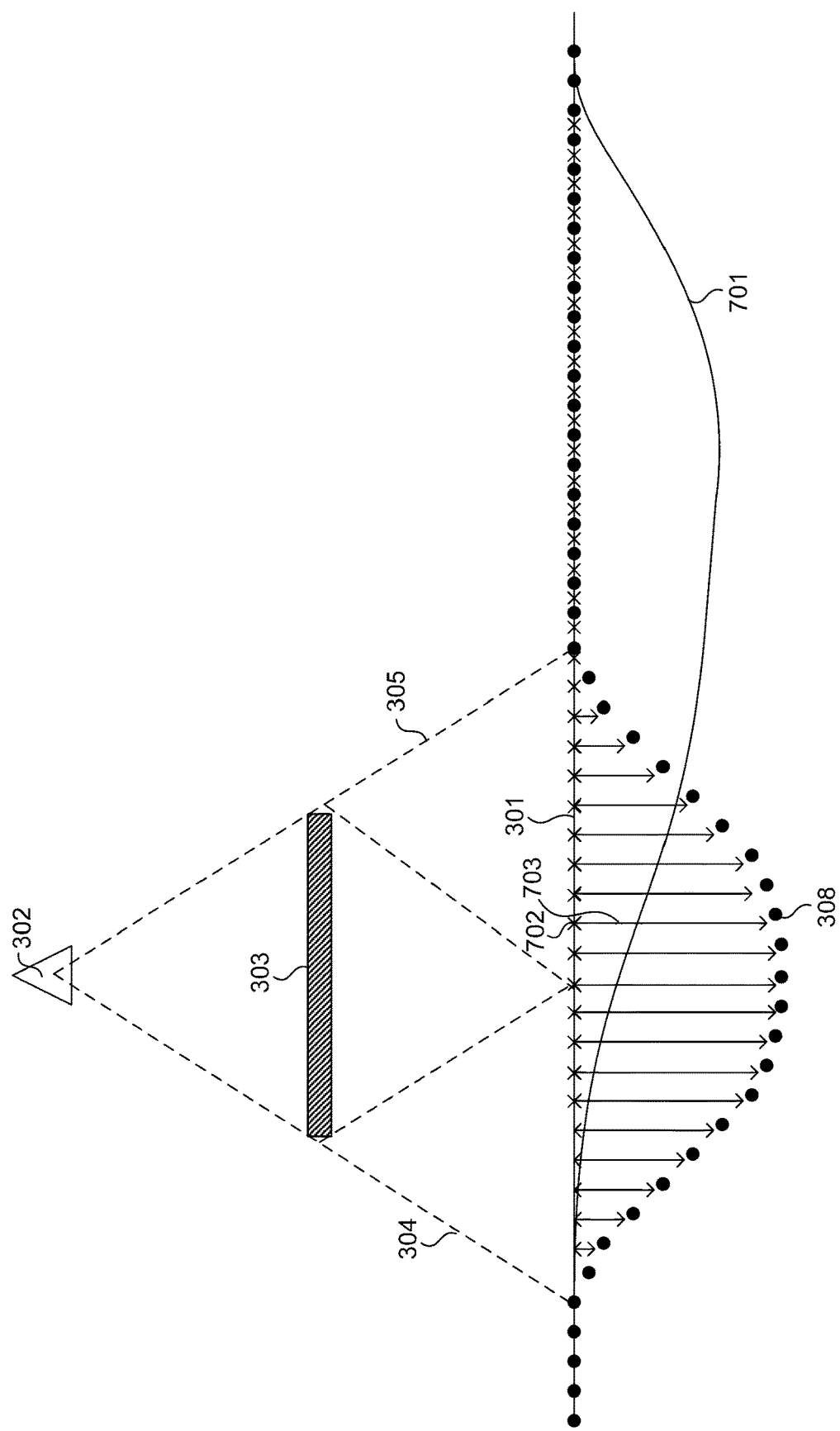

FIG. 7 illustrates this process of determining an estimated location of a mobile device schematically.

Figure 8:
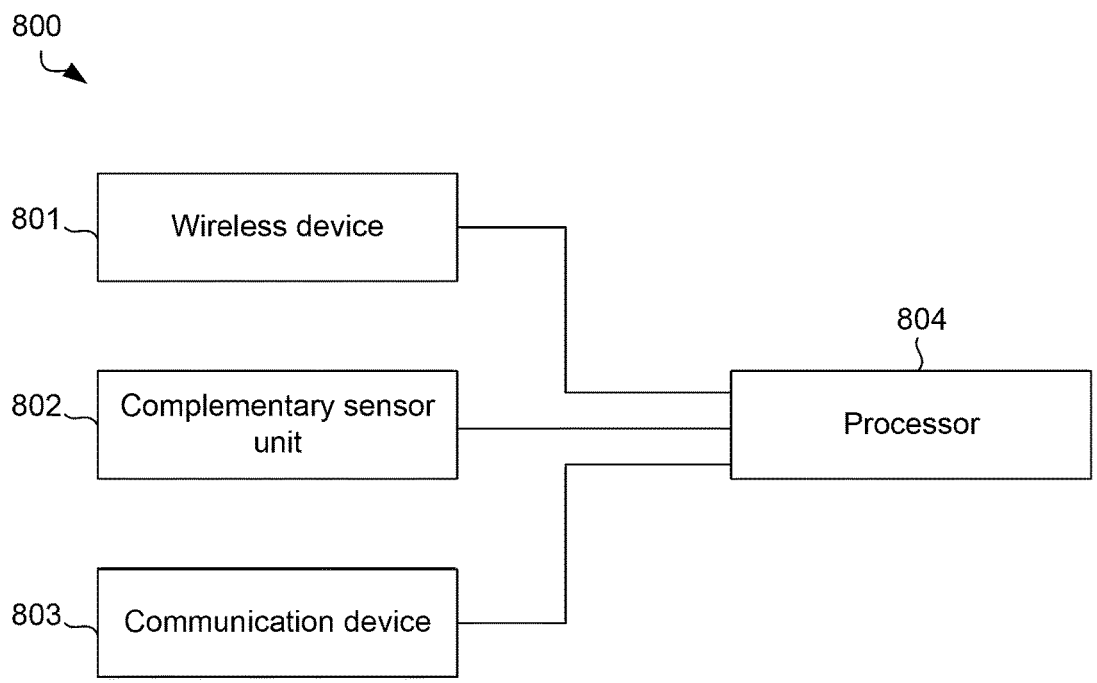

FIG. 8 is a block diagram of another example of computer system in FIG. 5 showing the structure of a mobile node.

Figure 9:
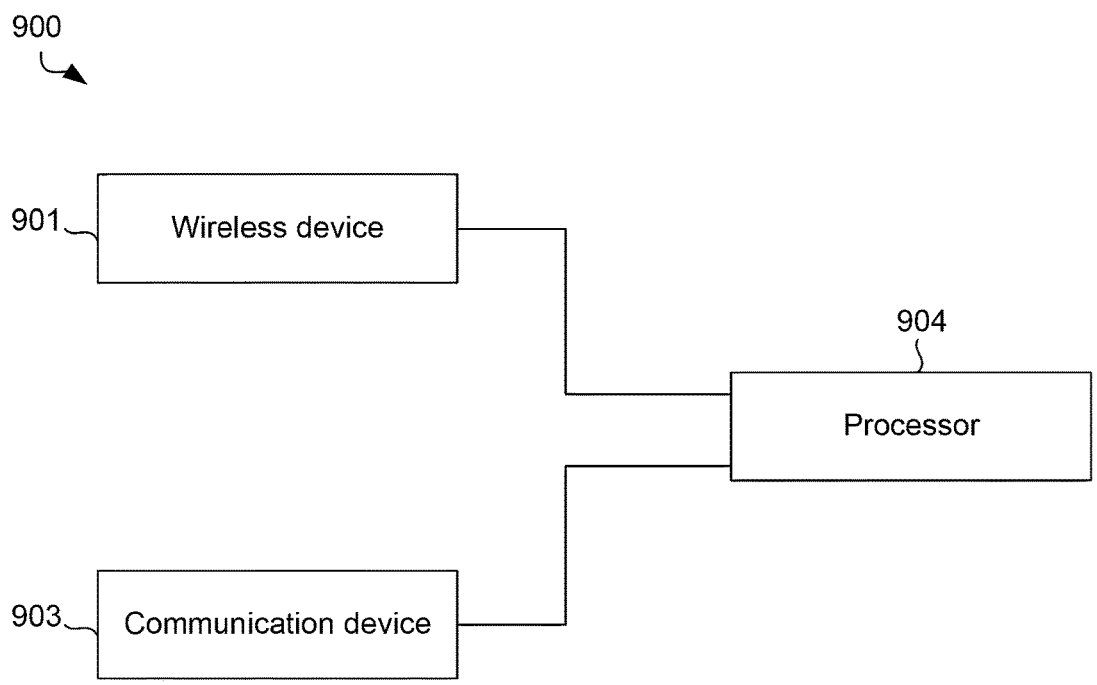

FIG. 9 is a block diagram showing the structure of a low-cost mobile node.

Figure 10:
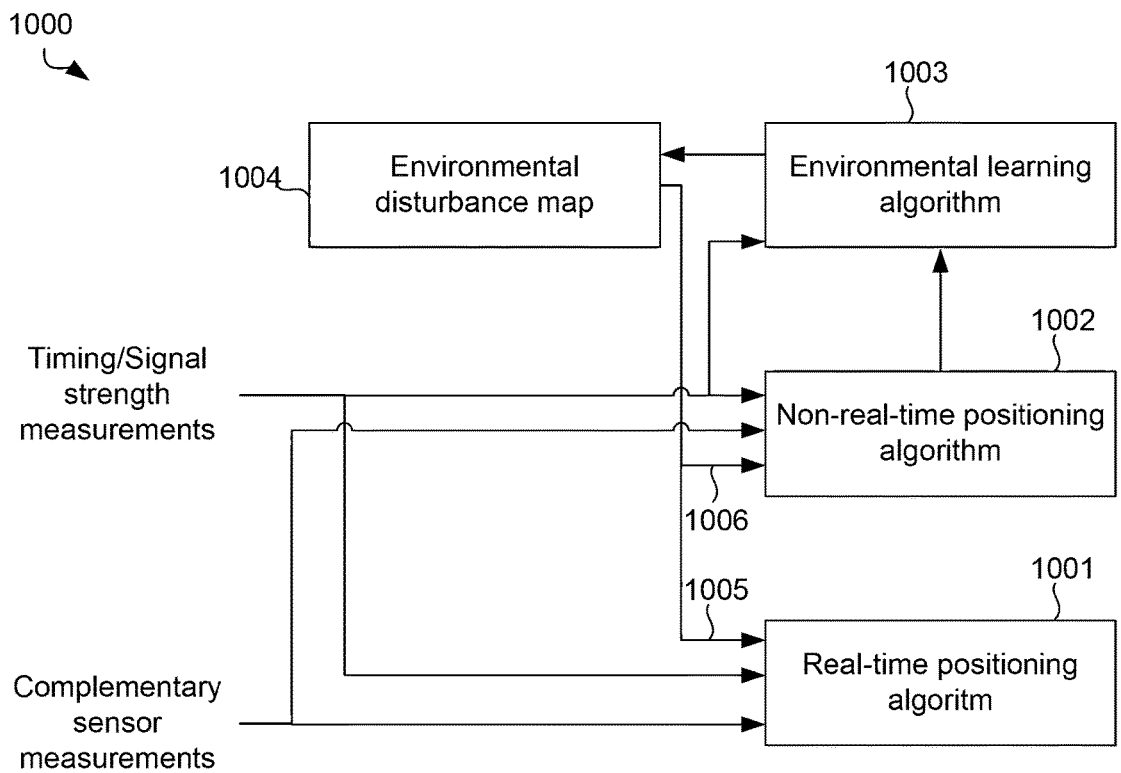

FIG. 10 is a block diagram showing the operations related to estimating the position of a mobile node and learning the disturbance in the application environment.

Figure 11:
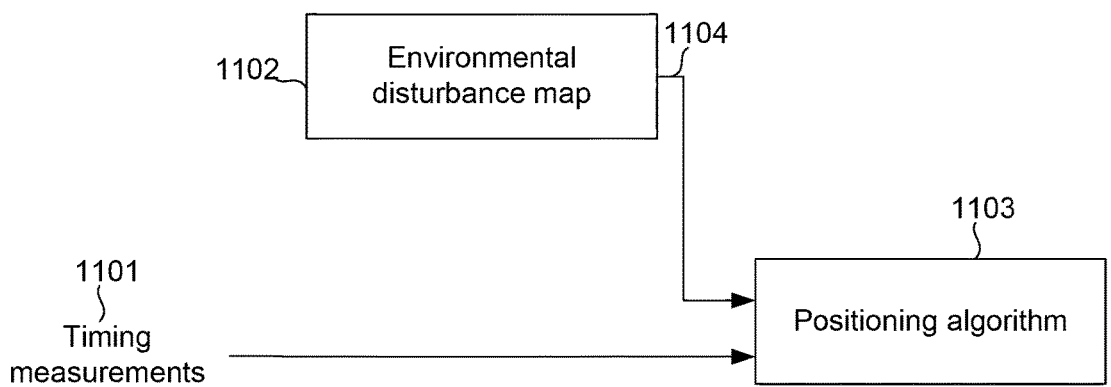

FIG. 11 is a block diagram showing the operations related to estimating the position of a mobile node.

Figure 12:
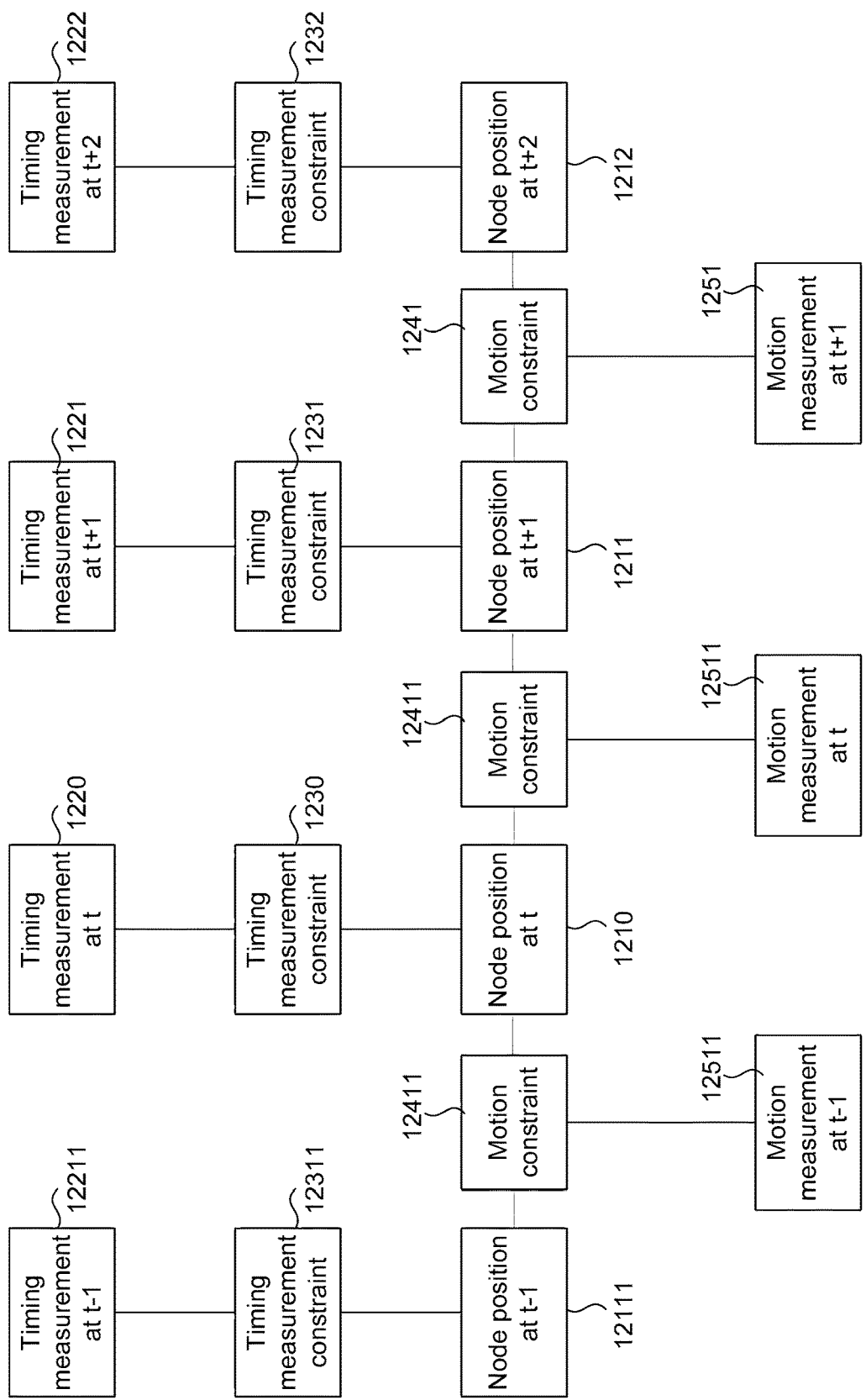

FIG. 12 is a graphical representation of the mathematical relations among the states of a mobile node.

Figure 13:
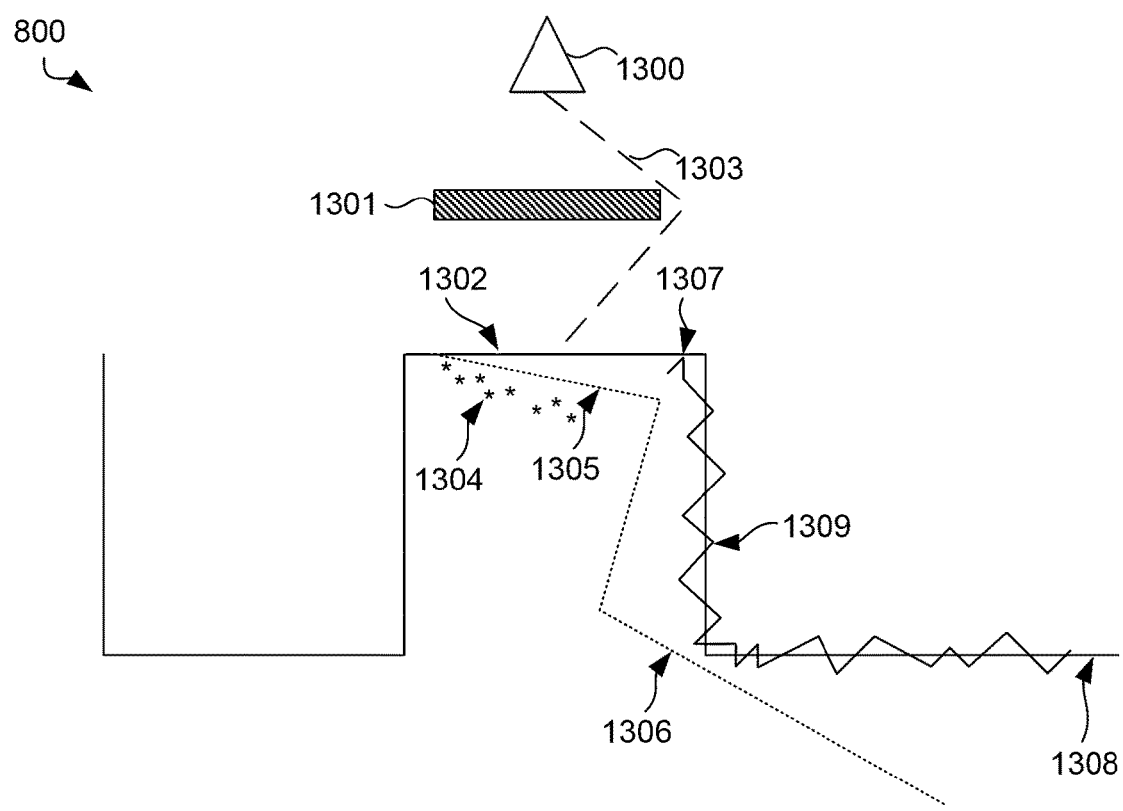

FIG. 13 illustrates an example where the positioning accuracy can be improved in disturbed environments by using the history of timing measurements and complementary sensor measurements to estimate the past positions.

Figure 14:
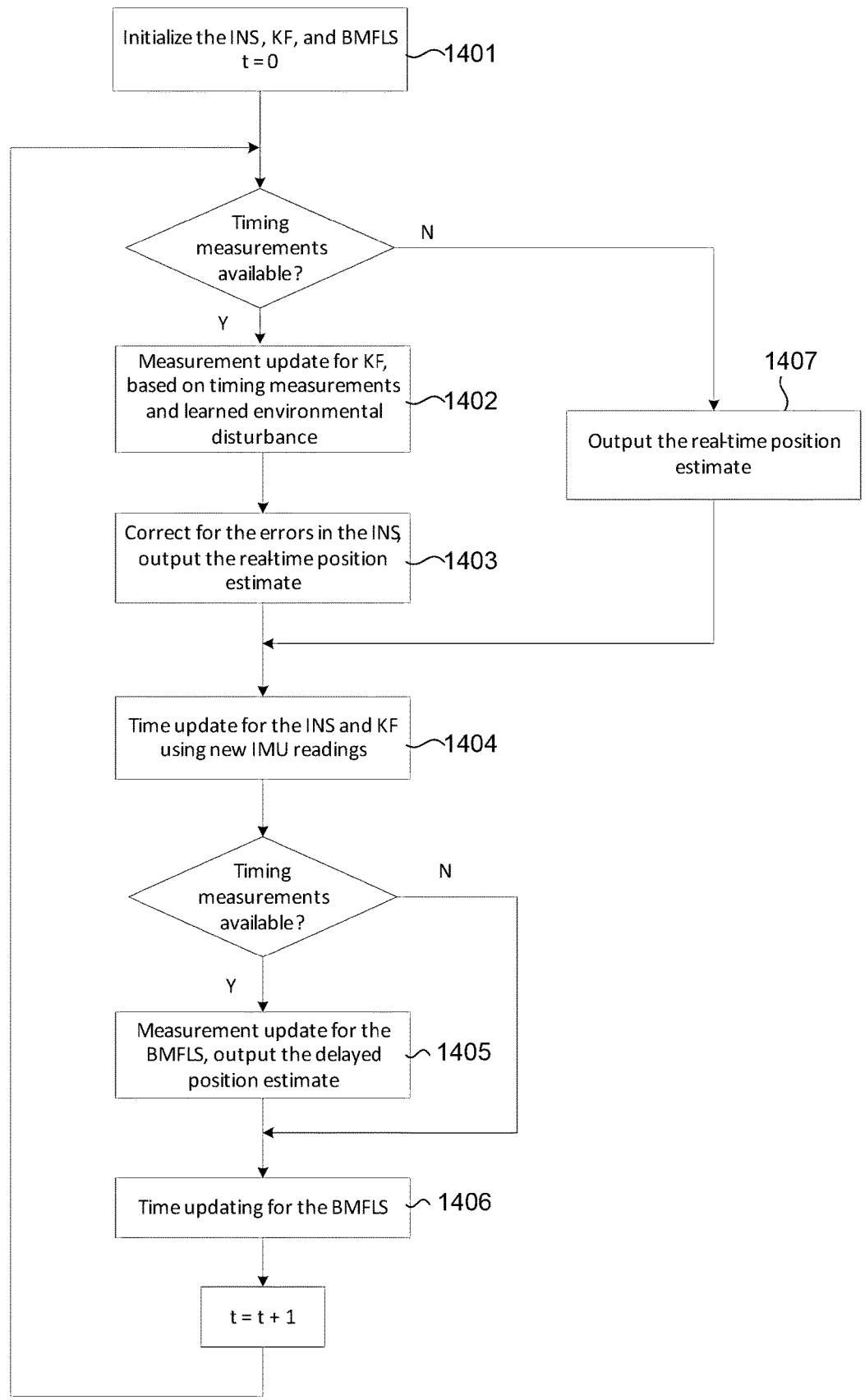

FIG. 14 is a flow chart illustrating the operation of position estimation.

Figure 15:
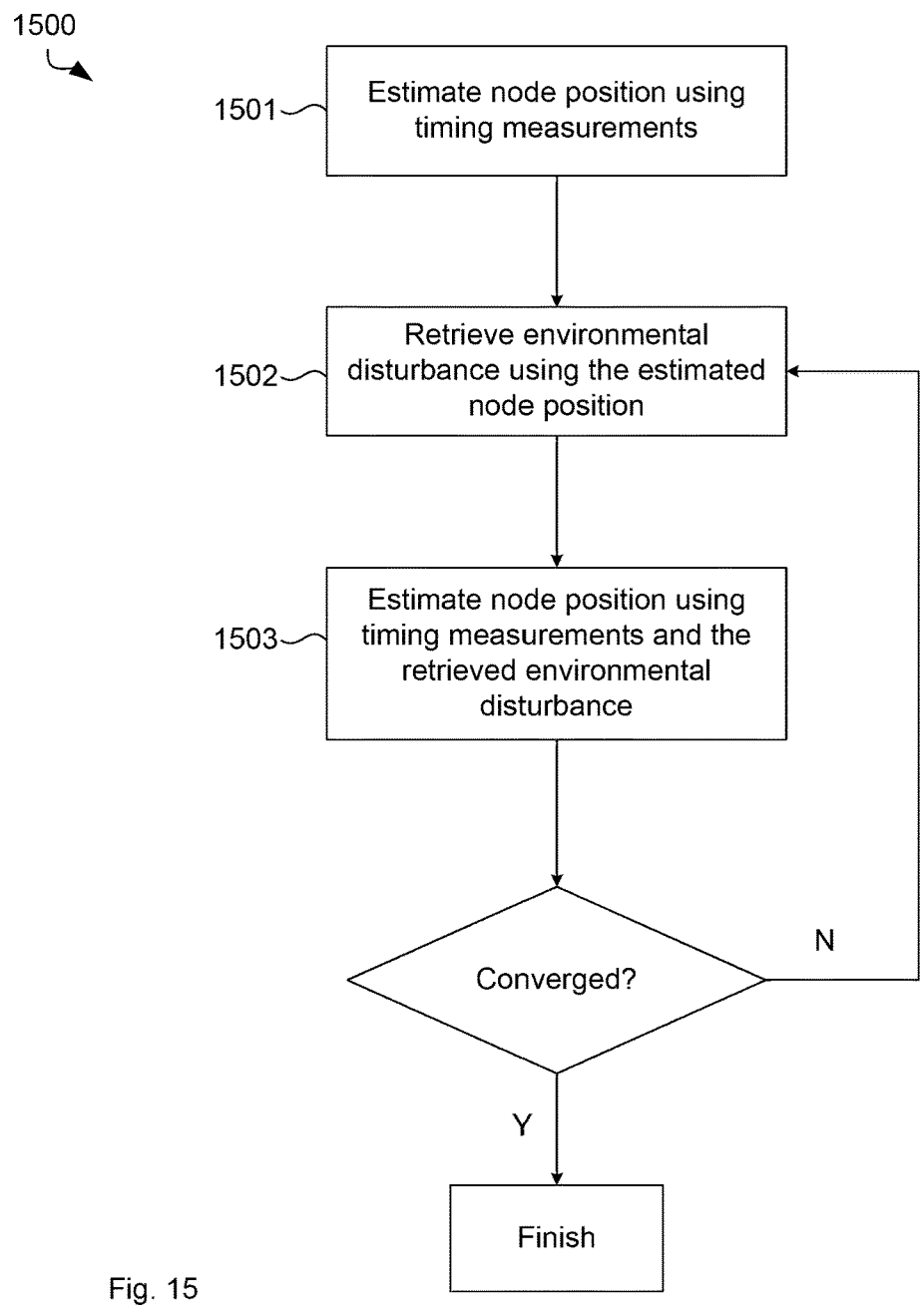

FIG. 15 is a flow chart using the environmental disturbance map to improve the positioning accuracy of a low-cost mobile node.

Figure 16:
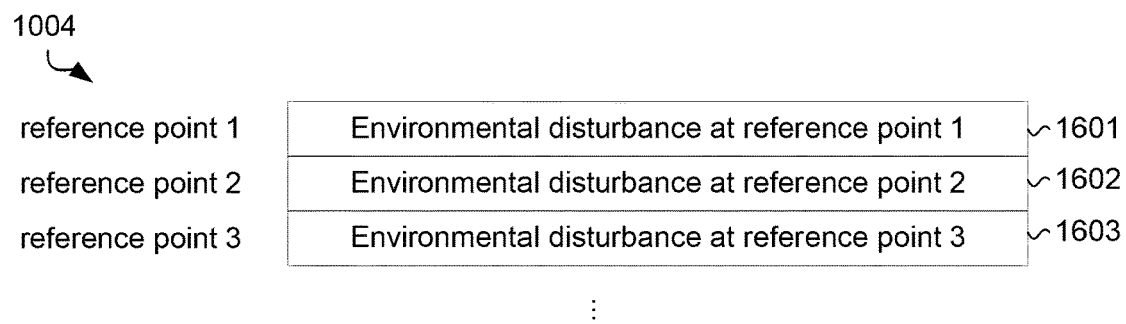

FIG. 16 shows an environmental disturbance map.

Figure 17:
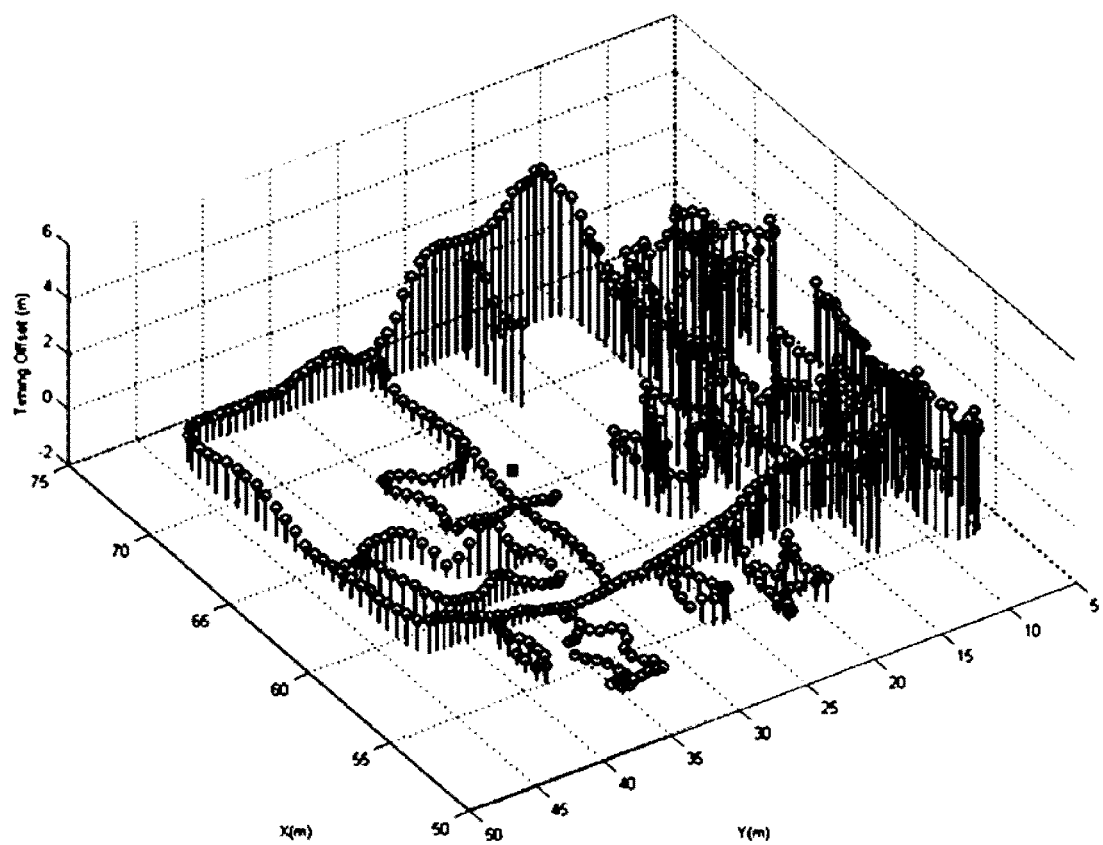

FIG. 17 illustrates the disturbance in an indoor environment.

Figure 18:
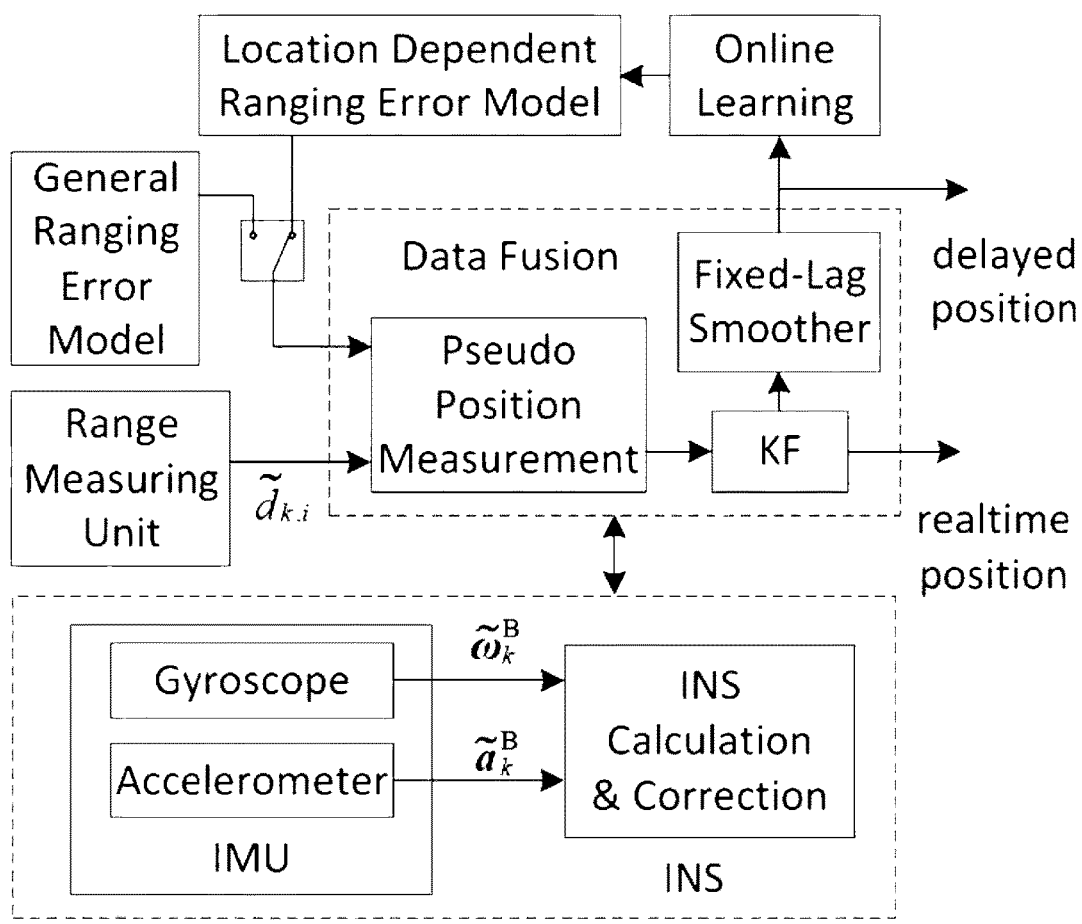

FIG. 18 shows an example structure of the nodes.

FIG. 19 illustrates an algorithm for integrated INS/IPS based on KF.

FIG. 20 illustrates an algorithm of data fusion for integrated INS/IPS with non-Gaussian ranging error distributions.

FIG. 21 illustrates an algorithm for online learning of a location-dependent ranging error model.

FIG. 22 illustrates the operation of a self-calibrating indoor positioning system.

Figure 23:
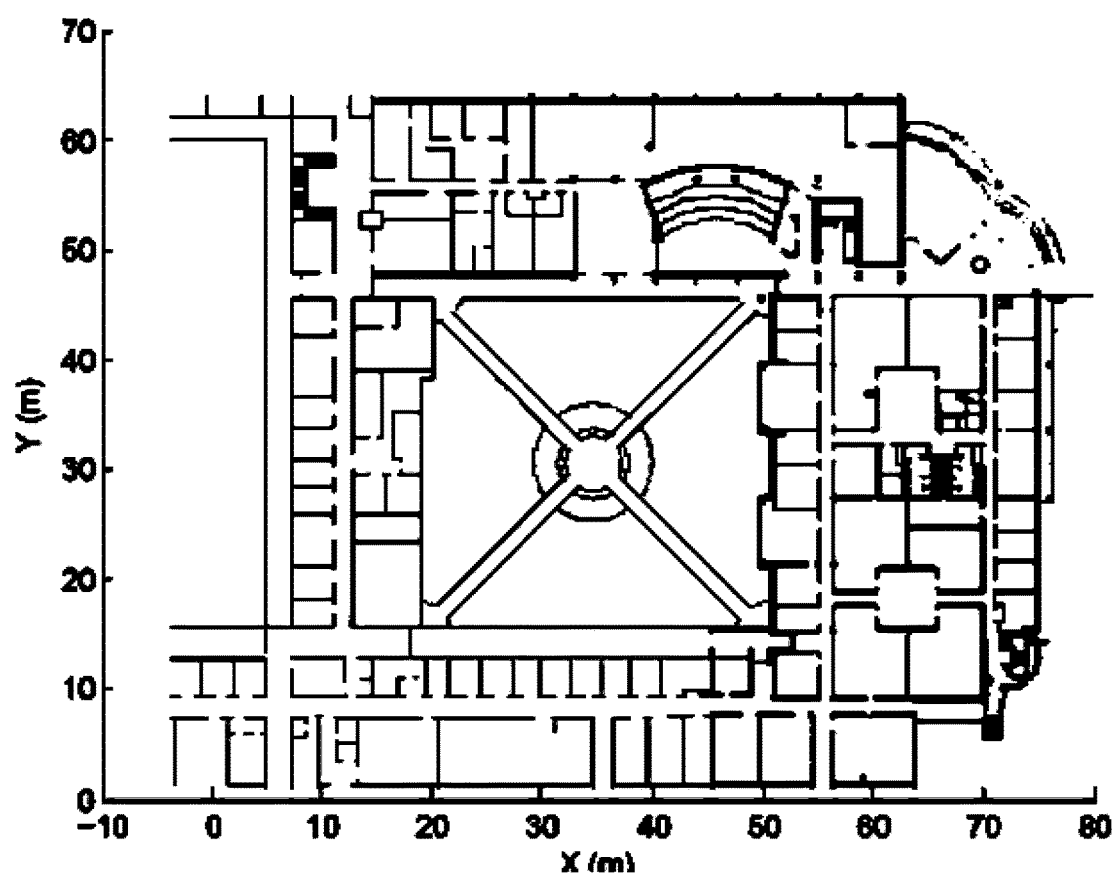

FIG. 23 illustrates an example indoor floor plan.

DESCRIPTION OF EMBODIMENTS

This disclosure proposes a method based on sensor fusion and environment learning for improving the accuracy of time-based positioning systems in environments disturbed by NLOS and multipath propagation. One or more mobile nodes in the time-based positioning system are augmented with one or more complementary sensors that provide information about the motion of the node. This way the sensor data from the complementary sensors is different to the radio measurement data, which means that a longer propagation path of the radiation due to obstacles does not cause a change in the sensor data from the complimentary sensors.

Each node equipped with complementary sensors combines timing measurements and the complementary sensor measurements for real-time position estimation. The node further use the history of timing measurements and complementary sensor measurements to estimate the position history or positions in the past, which achieves a significantly higher accuracy than the real-time position estimate. The node then uses the estimated position history or past positions to learn the disturbance in the application environment. The nodes in the system use the learned disturbance to improve real-time positioning accuracy when a node reaches a position or area that has been visited previously by nodes equipped with complementary sensors. As a result, device localization and tracking is enhanced by an improvement in the accuracy of time-based positioning system using sensor fusion and environment learning. Although some examples herein describe positioning using a time based positioning system, this could be substituted for any other system that measures distance between devices, such as using radio received signal strength, ultrasound ranging or laser ranging.

In other words, this disclosure provides a method based on sensor fusion and environment learning for improving the accuracy of time-based positioning systems in disturbed environments. The disturbance in the application environment is learned using accurately estimated past positions of one or more mobile nodes equipped with complementary sensors. The positioning accuracy in disturbed areas of the application environments can be significantly improved using the learned environmental disturbance. In addition, the environment learning is conduct online and does not require human intervention or reference transmitters. Therefore the system can be deployed easily and adapts automatically to changes in the application environment (e.g., if a furniture moved). The proposed system can be put into operation directly, with the positioning accuracy improved during operation. It should also be noted that the accuracy of the proposed system can be significantly higher than those of existing systems.

This disclosure proposes a method based on sensor fusion and environment learning for improving the accuracy of time-based positioning systems in environments disturbed by NLOS and multipath propagation. The proposed system operates as follows. One or more mobile nodes in the time-based positioning system are augmented with one or more complementary sensors that provide information about the motion of the node. This way the sensor data from the complementary sensors is different to the radio measurement data, which means that a longer propagation path of the radiation due to obstacles does not cause a change in the sensor data from the complimentary sensors.

For each node equipped with complementary sensors, timing measurements are combined with and the complementary sensor measurements for real-time position estimation. The history of timing measurements and complementary sensor measurements are used to estimate the position history or positions in the past, which achieves a significantly higher accuracy than the real-time position estimate. The estimated position history or past positions are used to learn the disturbance in the application environment. For each node in the system, the learned disturbance is used to improve real-time positioning accuracy when it reaches a position or area that has been visited previously by nodes equipped with complementary sensors. The disclosed method is applicable to any time-based positioning system using TOA, TDOA, or round-trip delay measurements.

This disclosure proposes a method based on sensor fusion and environment learning for improving the accuracy of time-based positioning systems in environments disturbed by NLOS and multipath propagation. The positioning system comprises multiple anchor nodes at known locations and one or multiple mobile nodes to locate. One or more mobile nodes in the system are equipped with one or more sensors that provide complementary information about the motion of the nodes. For each node equipped with one or more complementary sensors, the position history or positions in the past are estimated using the history of timing measurements and complementary sensor measurements, which achieves a significantly higher accuracy than the real-time position estimate. The estimated position histories or past positions are used to learn the disturbance in the application environment. The learned environmental disturbance is used to improve the real-time positioning accuracy when any node in the system reaches a position or area that has been visited previously by nodes equipped with complementary sensors. The disclosed method is applicable to any time-based positioning system using TOA, TDOA, or round-trip delay measurements.

The history of timing measurements and complementary sensor measurements is used to accurately estimate the position histories or past positions of mobile nodes in disturbed application environments. Complementary sensors that can be used include inertial measurement unit (IMU), video cameras, laser scanners, odometers, and pedometers. The measurements provided by these complementary sensors exhibit high short-term stability and provide information about the motion of the mobile nodes. Therefore combining the complementary sensor measurements with timing measurements for positioning can achieve higher accuracy than using timing measurements solely.

However, the accuracy of real-time positioning can still be severely compromised due to the persistent presence of environmental disturbance. For example, when an IMU is used in the system, the states involved in computing the motion of the object (e.g., attitude, acceleration, biases of gyroscope and accelerometer measurements) can be driven away from the correct values during computation by biased timing measurements caused by NLOS propagation, which significantly compromises the positioning accuracy. On the other hand, the past positions or position history of a mobile node can be estimated with significantly higher accuracy using the history of timing measurements and history of the complementary sensor measurements, since the measurements that come after a certain time t provide valuable information for inferring the position at time t. In an exemplary system, a Kalman Filter is employed to fuse the timing measurements and IMU readings, and a Fixed Lag Smoother (FLS) or a Fixed Interval Smoother (FIS) is employed to estimate a delayed position in the past or the position history, respectively.

The disturbance in the application environment is learnt, that is, an error data indicative of a difference between the first radio measurement and the historical location data is determined, based on the estimated past positions or position history for improving the accuracy of real-time positioning afterwards. Given the accurately estimated past positions or position history in the historical position data, along with the associated timing measurements, the environmental disturbance along the path travelled by the object can be estimated.

For example, the offsets in timing measurements caused by NLOS propagation (referred to as "ranging offset" henceforth) can be learned. In another example, the environmental disturbance can be characterized by position offsets, which are the difference between the true position and the estimated position. In an exemplary implementation, the characteristic of timing errors are represented by a location-dependent probability distribution model that is learned. This can be continuously updated, and is used to correct real-time measurements to improve positioning accuracy.

When any mobile node in the system reaches a position where the environmental disturbance ("stored error data") in the nearby area has been learned, the learned results are used for improving the positioning accuracy. That is, after receiving a radio measurement indicative of a propagation time of radio frequency radiation between a mobile device and the multiple stationary devices, the node determines an estimated location of the second mobile device based on the second radio measurement and the stored error data. Specifically, the offsets in timing measurements are corrected before position calculation, if the offsets in timing measurements are learned. If position offsets are learned, the position is estimated using the timing measurements and corrected with the corresponding position offset. In an exemplary system, the probability distributions of timing errors are used in probabilistic positioning algorithms, including algorithms based on Maximum Likelihood estimation and Bayesian estimation, and data fusion algorithms that combine timing measurements and measurements of complementary sensors for positioning.

An advantage of the proposed method is that the real-time positioning accuracy of a time based positioning system in disturbed areas of the application environments can be significantly improved if the areas have been visited before. In addition, the accuracy is further improved progressively as more visits are paid to those areas. The learned environmental disturbance can also be used by low-cost nodes that are not equipped with complementary sensors for improving the positioning accuracy.

The proposed method uses accurately estimated past positions for learning the application environment online, which is effort free and does not require additional reference transmitters to be deployed in the application environment for this purpose.

FIG. 4 shows a system 400 for determining an estimated location of a mobile device. The system 400 comprises multiple anchor nodes 401, 402, 403 and 404. The anchor nodes are also referred to as stationary nodes. The system 400 further comprises mobile nodes 405, 406 and 407. It is noted here that the terms 'node' and 'device' are used interchangeably. Each node 401-407 is equipped with at least one wireless device, such as a Wi-Fi adapter. The localization is based on measuring the timing of wireless signals, which can be time difference of arrival (TDOA), time of arrival (TOA), or round trip delays. Possible configurations of system 400 include equipping all nodes 401-407 with transceivers (for measuring round trip delay), equipping mobile nodes 405-407 with transmitters and anchor nodes 401-404 with receivers (for measuring TDOA), or equipping anchor nodes 401-404 with transmitters and mobile nodes 405-407 with receivers (for GPS-like TDOA).

However, other configurations are also applicable in system 400. There is at least one mobile node, such as first mobile node 405 which is equipped with at least one complementary sensor. For example, first mobile node 405 may be equipped with an inertial sensor, such as a military grade INU. The remaining mobile nodes 406 and 407 may be of a low-cost and without such sensors, such as Wi-Fi-only nodes. The timing measurements are used along with other useful information for determining the locations of the mobile nodes 405-407. The computation can be carried out in a processing centre 408. Alternatively, the computation can be carried out in the nodes or distributed to other processors in the network, in which case the processing centre 408 is not required.

FIG. 5 illustrates a computer system 500 for determining an estimated location of a mobile device in more detail. Any of the stationary nodes 401-404, mobile nodes 405-407 and processing centre 408 may share the same or similar structure as shown in FIG. 5. The computer system 500 comprises a processor 501 connected to a program memory 502, a data memory 503, a communication port 504 and a user port 505 connected to a display 506. The computer system 500 further comprises a complimentary sensor 507 although it may be sufficient if a single one of the mobile nodes 405-407 comprises the complimentary sensor 507.

The program memory 502 is a non-transitory computer readable medium, such as a hard drive, a solid state disk or CD-ROM. Software, that is, an executable program stored on program memory 502 causes the processor 501 to perform the method in FIG. 6, that is, processor 501 receives a first radio measurement through communication port 504, receives sensor data from complimentary sensor 507, determines historical location data and an error data indicative of a difference between the first radio measurement and the historical location data. Processor 501 of the same device or of a different device then receives a second radio measurement and determines an estimated location based on the second radio measurement and the previously calculated error data. The term "determining an estimated location" refers to calculating a value that is indicative of the estimated location. This also applies to related terms.

Processor 501 may store the radio measurement, sensor data, historical location data, error data and estimated location on data store 503, such as on RAM or a processor register. Processor 501 may also send the determined values and data via communication port 504 to a server, such as processing centre 408 or to any of the nodes 401-407.

The processor 501 may receive data, such as radio measurements or error data, from data memory 503 as well as from the communications port 504. In one example, the processor 501 receives the above data from other devices 401-408 via communications port 504, such as by using a Wi-Fi network according to IEEE 802.11. The Wi-Fi network may be a decentralised ad-hoc network, such that no dedicated management infrastructure, such as a router, is required or a centralised network with a router or access point managing the network.

The user port 505 may be connected to a display 506 that shows the error data for multiple locations or the estimated location of the computer system 500 or any or all of the mobile nodes 405-407. Although communications port 504 and user port 505 are shown as distinct entities, it is to be understood that any kind of data port may be used to receive data, such as a network connection, a memory interface, a pin of the chip package of processor 501, or logical ports, such as IP sockets or parameters of functions stored on program memory 502 and executed by processor 501. These parameters may be stored on data memory 503 and may be handled by-value or by-reference, that is, as a pointer, in the source code.

The processor 501 may receive data through all these interfaces, which includes memory access of volatile memory, such as cache or RAM, or non-volatile memory, such as an optical disk drive, hard disk drive, storage server or cloud storage. In the case of the processing centre 408, the computer system 500 may further be implemented within a cloud computing environment, such as a managed group of interconnected servers hosting a dynamic number of virtual machines.

It is to be understood that any receiving step may be preceded by the processor 501 determining or computing the data that is later received. For example, the processor 501 detects a Wi-Fi signal and receives Wi-Fi data and stores the received data in data memory 503, such as RAM or a processor register. The processor 501 then requests the data from the data memory 503, such as by providing a read signal together with a memory address. The data memory 503 provides the data as a voltage signal on a physical bit line and the processor 501 receives the data via a memory interface. Based on the data and the included time stamps, processor 501 can determine the radio measurement, such as the round trip delay and use that result as described herein.

It is to be understood that throughout this disclosure unless stated otherwise, nodes, edges, graphs, solutions, variables, locations, parameters and the like refer to data structures, which are physically stored on data memory 503 or processed by processor 501. Further, for the sake of brevity when reference is made to particular variable names, such as "period of time" or "quantity of movement" this is to be understood to refer to values of variables stored as physical data in computer system 500.

FIG. 6 illustrates a method 600 as performed by processors of one or more of devices 401-408 in system 400 for determining an estimated location of a mobile device. FIG. 6 is to be understood as a blueprint for the software program and may be implemented step-by-step, such that each step in FIG. 6 is represented by a function in a programming language, such as C++ or Java. The resulting source code is then compiled and stored as computer executable instructions on program memory 502.

The method 600 commences by receiving 601 a first radio measurement indicative of a first propagation path length of radio frequency radiation between the first mobile device and the multiple stationary devices. For example, processor 501 receives Wi-Fi data and determines based on the Wi-Fi data a TDOA, TOA or round trip delay. Processor 501 may also determine a distance or length of the propagation path based on these quantities. The first radio measurement may also comprise a signal strength value such that processor 501 can calculate the attenuation given a predetermined signal strength at the transmitter 302. Based on the attenuation processor 501 can then calculate the distance from the transmitter 302.

Processor 501 then receives 602 sensor data from complementary sensors indicative of the movement of the first mobile device. The sensor data is of a type different to the radio measurement, that is, that a longer propagation path of the radiation due to obstacles does not cause a change in the sensor data from the complementary sensors. For example, processor 501 receives acceleration data from an inertial sensor comprising gyroscopes and accelerometers to provide angular and translational acceleration.

Processor 501 determines 603 a historical location of the first mobile device based on the first radio measurement and the sensor data. For example, processor 501 uses a smoother to calculate the historical location.

FIG. 7 illustrates this process schematically. It is noted that FIG. 7 is not to scale to simplify presentation and the actual values may be different. Further, FIG. 7 illustrates a single stationary device 302. While further stationary devices are used to determine the locations of the mobile device, it is assumed here that a LOS exists to these devices and therefore, these stationary devices are omitted from FIG. 7 for the sake of clarity.

Figure 3:
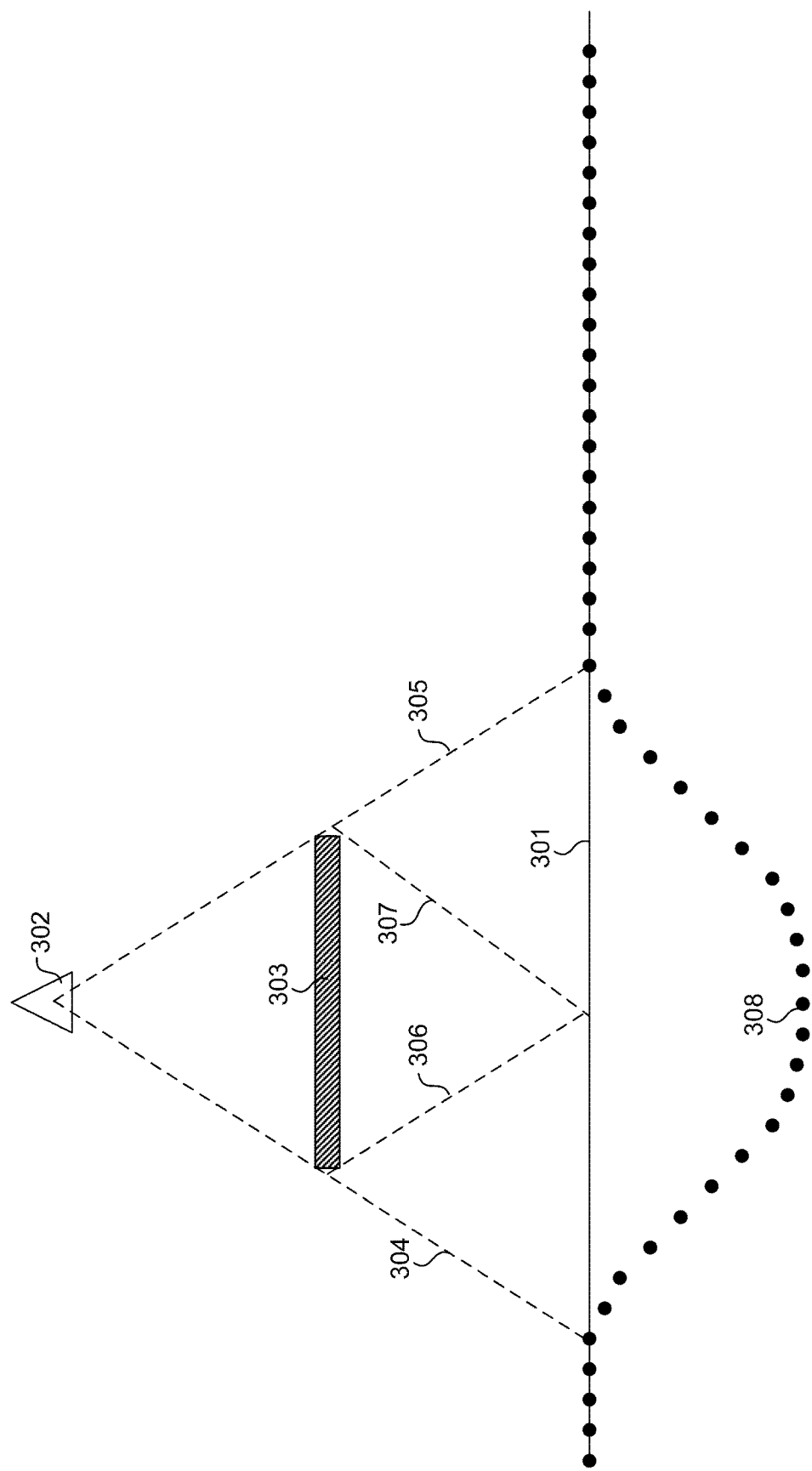
FIG. 3 illustrates another prior art scenario where the mobile device moves along a straight travel path.

As discussed with reference to FIG. 3, the mobile device travels from left to right along solid line 301. As the obstacle blocks the line of sight measurement, an error occurs in the locations calculated based on only the RF signal as indicated by the solid dots 308. The Kalman filter fuses the RF signal measurement with the complimentary sensor data to calculate current positions as indicated by curved line 701. It can be seen that the inaccuracy in the position from the RF signal gradually introduces an error into the fused result as curved line 701 deviates from straight line 301. However, that error is already less than when no complimentary sensors are used (compare curved line 701 to dots 308).

At the current position, which is the right-most position in this example, processor 501 determines historical location data as indicated by the crosses, such as example historical location 702. At each point in the past, processor 501 uses the data that was known at that time as well as data that processor 501 received after that time and as a result, the cross indicating the historical location 702 follows the actual travel path 301 much closer even while the line of sight to the stationary device 302 is blocked.

Processor 501 determines 604 error data indicative of a difference 703 between a historical radio measurement 308 and the historical location 702. Error data 703 may represent the distance between one of the crosses and one of the dots. It is noted that the distance does not need to be vertical or perpendicular to the travel path 301 as the NLOS inaccuracies can affect the location in all directions. In another example, the error data represents a range offset to a particular stationary device. In other words, the error data indicates that when the mobile device is at this particular location, that particular stationary device is actually 300 mm closer than what the RF measurements indicate. Similarly, processor 501 calculates further error values for the other stationary devices.

Processor 501 stores 605 the error data associated with the historical location data on a data store 503. For example, data store 503 hosts a two-dimensional look-up table ("error map" herein) that stores for each sampled location of the area of interest one error value.

Next, processor 501 receives 606 a second radio measurement indicative of a second propagation path length of radio frequency radiation between the mobile device and the multiple stationary devices and determining 607 an estimated location of the mobile device based on the second radio measurement and the stored error data. In other words, when the mobile device re-visits the same location or a nearby location, processor 501 queries the previously determined and stored error data to compensate for the NLOS inaccuracy.

It is noted that steps 606 and 607 may be performed by a different mobile device, such as by a mobile device that does not comprises complementary sensors 507. These steps may also be performed by the same device as the other steps. For example, the mobile device may explore the area of interest slowly the first time to construct accurate error data and then use these values to accurately move around at higher speeds.

As mentioned before, the timing measurements between mobile nodes and anchor nodes are inaccurate due to measurement noise and environmental disturbance. Particularly, the environmental disturbances caused by NLOS and multipath propagation severely degrade the positioning accuracy. To address this issue, the environmental disturbance is learned using past positions of mobile nodes 405-407 which are accurately estimated using the history of timing measurements and complementary sensor measurements, and used for improving the real-time positioning accuracy of all mobile nodes in the system.

Depending on the system configuration, some nodes are capable of communicating with other nodes in the system, the processing centre 408, or processors distributed in the system (e.g., for transferring timing measurements or learned environmental disturbance to a processor). This communication may be wired (e.g. between fixed anchor nodes and the processing centre) or wireless (e.g. between anchor nodes and mobile nodes) or a combination of both. The wireless system for timing measurements could be used for wireless communications or there could be separate communication systems.

FIG. 8 is a block diagram of another example of computer system 500 in FIG. 5 showing the structure of a mobile node 405. A wireless device 801 is used for timing measurements and can be a wireless transmitter, a wireless receiver, or a wireless transceiver, as described above. A complementary sensor unit 802 provides information about the motion of the mobile node 405. Sensors that can be used include but not limited to inertial measurement unit (IMU), video cameras, laser scanners, odometers, and pedometers. A processor 804 controls the operation of the mobile node, and may also be responsible for the computations in the system (e.g., position computing, environmental disturbance learning), depending on the system configuration. The node is also equipped with an optional communication device 803 for possible data communication with other components of the system (e.g., anchor nodes, other mobile nodes, the processing centre 408, or processors distributed in the system).

For example, the communication device 803 is used if the position of a mobile node 405 is computed in the processing centre 408 or distributed processors in the system, since the complementary sensor measurements collected locally by the mobile node are sent to the positioning algorithms. The communication device 803 is not required if the anchor nodes are time-synchronized, the wireless device 801 in a mobile node 405 is a receiver providing TDOA measurements, and the mobile node estimates its position locally in the processor 804 and learns the environment only for its own use. The communication device 803 can also be merged with the wireless device 801 (i.e., using the same wireless device).

FIG. 9 is a block diagram showing the structure of a low-cost mobile node 406. Similar to mobile node 405, each mobile node 406 contains a wireless device 901 and a processer 904. However, it is not equipped with complementary sensors. The node is also equipped with an optional communication device 903. Particularly, the communication device 405 is used if the position of a mobile node 406 is computed locally in the processer 904, in which case the node communicates with other members (e.g., mobile nodes 405, the processing centre 408, or distributed processors) of the system for the learned environmental disturbance. The communication device 903 is not required if the wireless device 901 of a mobile node 406 is a wireless transmitter and the position of the node is computed in the processing centre 408 or distributed processors in the system using TDOAs measured at the anchor nodes.

FIG. 10 is a block diagram 1000 showing the operations related to estimating the position of a mobile node 405 and learning the application environment. Depending on the configuration of each node, the timing measurements and complementary sensor measurements can be used in two sensor fusion algorithms 1001 and 1002 for position estimation. The algorithm 1001 is used for estimating the real-time position of the mobile node. The algorithm 1002 uses the history of timing measurements and complementary sensor measurements to estimate the position history or past positions of the mobile node, which achieves a significantly higher accuracy than the algorithm 1001.

The position history or past positions estimated in algorithm 1002 are used along with the associated timing measurements in the environment learning algorithm 1003 to learn the application environment, with the learning result stored in the environmental disturbance map 1004. The environmental disturbance map 1004 is used by algorithms 1001 and 1002 for improving the positioning accuracy when the mobile node reaches a position or area that has been visited previously. Each mobile node 405-407 can be configured to perform algorithm 1001 only (e.g., for real-time tracking), algorithm 1002 only (e.g., for non-real-time tracking or environment learning), or both algorithm 1001 and 1002, depending on the application of each node. However, there is at least one mobile node 405 that performs algorithm 1002 for learning the environment. FIG. 10 can be implemented in the mobile node 405-407, in the optional processing centre 408, or distributed to other processors in the network. In addition, each block in FIG. 10 can be separately implemented in different processors. If more than one environmental disturbance maps 1004 are implemented in the system, a consensus algorithm may be employed so that they are consistent with each other. In addition, the positioning algorithms 1001 and 1002 are not necessarily independent to each other. In some cases, algorithm 1002 can be implemented by extending algorithm 1001, and computations carried out in algorithm 1001 can be reused in algorithm 1002.

FIG. 11 is a block diagram showing the operations related to estimating the position of a mobile node 406. The timing measurements 1101 and the environmental disturbance map 1102 are used together in algorithms 1103 for position estimation. Similar to FIG. 10, each block in FIG. 11 can be separately implemented in different processors.

FIG. 12 is a graphical representation of the mathematical relations among the states of a mobile node 405, which illustrates the advantage of combining timing measurements and complementary sensor measurements for position estimation in algorithms 1101 and 1102. The position of a mobile node 405 at time t is represented by 1210. Similarly, 12111, 1211, and 1212 represent the position of the node at time t-1, t+1, and t+2, respectively. The timing measurements obtained at the corresponding time steps are represented by 12211, 1220, 1221 and 1222. 12311, 1230, 1231 and 1232 represent the relation between the corresponding node position 121xx and timing measurements 122xx, since the position of the node at each time step and the corresponding timing measurements are related. In addition, the position of the mobile node at a specific time step is related to the position at the previous time and that at the subsequent time step through the motion of the node (which are measured directly or indirectly by the complementary sensors and represented by 125xx), as indicated by the constraints 124xx.

Therefore, the positions of the node at different time steps are related to each other, as can be seen by the chain structure in FIG. 12. It should also be noted that the constraints 124xx are possibly related to each other. For example, the positions of the node at two consecutive time steps are related through the velocities at the corresponding time steps. The velocities at two consecutive time steps are dependent on the corresponding heading directions, which are related to each other through the angular rate of the node. The position of the mobile node can be estimated more accurately by exploiting the chain structure in FIG. 12 (i.e., exploiting the relation among the positions of the node at different time steps) than estimating the node position at each time step independently. Particularly, the history of timing measurements and complementary sensor measurements can be used for estimating the position of the node. In the real-time positioning algorithm 1002, all the available measurements prior to time step t are used for estimating the node position at t. In algorithm 1102, all the available timing measurements and complementary sensor measurements up to time t are used to estimate the node position at a past time t' (t'<t) or the position history in a past period between t" and t' (t"<t'<t). Algorithm 1102 can achieve significantly higher positioning accuracy than algorithm 1101 and is more robust to environmental disturbance, since the measurements between t' and t provide valuable information for estimating the node position at t' or the position history between t" and t'.

The positioning algorithms 1001 and 1102 can be implemented as Kalman filters, Particle filters, Bayesian smoothers, deterministic optimization problems, or any other sensor fusion algorithms, depending on the type of complementary sensors used, the computational capability of the processors where the algorithms are implemented, and other possible factors.

FIG. 13 illustrates an example where the positioning accuracy can be improved in disturbed environments by using the history of timing measurements and complementary sensor measurements to estimate the past, that is, historical, positions/locations. The solid line denotes the true trajectory of a mobile node. The triangles denote the position of the anchor nodes. In region 1302, the line-of-sight signal path between anchor 1300 and the object is blocked by the obstacle 1301. Therefore the wireless signal for timing measurements travels along a NLOS path 1303, resulting in offsets in the timing measurements. The asterisks 1304 denote the positions estimated using timing measurements only, which are biased due to the offset in timing measurements. 1305 denotes the positions estimated by a real-time sensor fusion algorithm, where the position at time t is estimated using all the available timing measurements and complementary sensor measurements up to time t.

Since the position of the object is also constrained by the past measurements, the accuracy of 1305 is higher than that of 1304. However, since all the timing measurements in region 1302 with respect to anchor 1300 are subject to offsets, the errors are gradually accumulated. Therefore the states related to the motion of the node are driven away from the correct values. For example, the heading direction of the mobile node can assume an erroneous value because of the biased timing measurements in region 1302. 1306 denotes the positions of the node from point 1307 to point 1308 predicted using the estimated heading direction at point 1307 and the subsequent complementary sensor measurements. It can be seen that there is a significant deviation between the true trajectory and 1306, and the deviation increases with time. 1309 denotes the positions of the node estimated using timing measurements between point 1307 and point 1308, which are much closer to the true trajectory (although are subject to offsets in certain regions due to environmental disturbance) than 1306 does. The deviation between 1306 and 1309 thus provides valuable information for estimating the position and motion state of the mobile node in region 1302. Therefore, the positioning accuracy can be significantly improved by using the history of timing measurements and history of the complementary sensor measurements to estimate the position history or positions in the past.

Environment Learning and Positioning Accuracy Improving

The position history or past positions estimated in algorithm 1002 are used along with the associated timing measurements in the environment learning algorithm 1003 to learn the application environment. The learning result is stored in the environmental disturbance map 1004, which is used in algorithms 1001, 1002 and 1003 for improving the positioning accuracy afterwards, as indicated by 1005, 1006, and 1104.

The environmental disturbance map 1004 provides a mapping from a spatial location (x, y) in a two-dimensional space (the same concept applies to three-dimensional applications) to the corresponding environmental disturbance at (x, y). It can be implemented in various approaches, depending on the mapping method and the characterization of environmental disturbances. Specifically, the environmental disturbance at a specific position (x, y) can be characterized by the range offset associated with each anchor node, or the position offset defined as the difference between the true position and that estimated using timing measurements, or any other quantities that can represent the influence of the environment on the positioning system. In addition, the mapping between a location and the corresponding environmental disturbance can be implemented in various approaches, including database systems, continuous function, artificial neural networks, look-up tables, look-up matrices, and any other appropriate approaches. The environment learning algorithm 1003 and the positioning algorithm (1001, 1002, and 1103) vary accordingly with the implementation of the environmental disturbance map 1004. Several possible implementations of these methods are given below, and it should be noted that many others could be devised using similar concepts.

Approach 1:

The environmental disturbance is characterized by the ranging offsets associated with each anchor node. The environmental disturbance map 1104 is implemented as a database or a table, with each entry storing the ranging offsets at a particular position. The map is updated in the environment learning algorithm 1103 by inserting new entries containing estimated positions (by algorithm 1102) and the associated ranging offsets into the database/table. When estimating the position of a mobile node, the positioning algorithm (1101, 1102, or 1103) first queries the disturbance map 1104 for ranging offsets associated with the timing measurements using an initial estimate of the node position. Particularly, the ranging offsets at the nearest recorded locations in 1104 can be returned (nearest neighbour), or a weighted average of those at several nearest recorded locations is returned. The timing measurements are then corrected for offsets and used for position calculation.

Approach 2:

The environmental disturbance is characterized by the ranging offsets associated with each anchor node. The environmental disturbance map 1104 is implemented as a two-dimensional table. Each entry of the table corresponds to a discrete grid in the application environment and stores the ranging offsets in the corresponding grid area. The map is updated in algorithm 1103 by combining newly estimated positions and the associated ranging offsets with existing records in the table to update the ranging offsets for each grid area. To obtain the ranging offsets at a certain position, the coordinates are quantised to the discrete grid and the corresponding entry in the table is returned. Similar to Approach 1, the positioning algorithm retrieves ranging offsets from the map using an initial estimate of the node position and uses the obtained ranging offsets for correcting the timing measurements and improving the positioning accuracy.

Approach 3:

The environmental disturbance is characterized by the ranging offsets associated with each anchor node. The ranging offset across the application environment for each anchor node is modelled as a continuous function (e.g., a mixture of Gaussians) or a neural network, which takes a position as the input argument and outputs the ranging offset at that position for the corresponding anchor node. The environmental disturbance map 1104 is implemented as set of continuous functions or neural networks (each corresponding to an anchor node). Positions estimated by algorithm 1102 and the associated ranging offsets are used in algorithm 1103 to estimate the parameters of the functions or train the neural networks in 1104. To obtain the ranging offsets at a certain position, the coordinates are used as inputs to each of the continuous function or neural network in 1104. Similar to Approach 1, the positioning algorithm retrieves ranging offsets from the map using an initial estimate of the node position and uses the obtained ranging offsets for correcting the timing measurements and improving the positioning accuracy.

Approach 4:

The environmental disturbance is characterized by the ranging offsets associated with each anchor node. The ranging offset across the application environment for each anchor node is modelled as a neural network, which takes timing measurements as the input arguments and outputs the associated ranging offsets. The environmental disturbance map 1104 is implemented as set of neural networks (each corresponding to an anchor node). Positions estimated by algorithm 1102 are used to compute the corresponding ranging offsets, which are used along with the associated timing measurements to train the neural networks. When estimating the position of a mobile node, the positioning algorithm (1101, 1102, or 1103) first queries the disturbance map 1104 for ranging offsets using the timing measurements. The timing measurements are then corrected for offsets and used for position calculation.

Approach 5

The environmental disturbance map 1104 is implemented as a database or a table, with each entry storing the timing measurements at a particular position. The map is updated in the environment learning algorithm 1103 by inserting new entries containing estimated positions (by algorithm 1102) and the associated timing measurements into the database/table. When estimating the position of a mobile node, the positioning algorithm (1101, 1102, or 1103) queries the disturbance map 1104 for records that match the timing measurements, and the position of the node is given by that corresponding to the best match or a weighted average of several best matches. This is similar to the operation of a fingerprint-based positioning system.

Approach 1-5 are only five of the various possible approaches for implementing the system, and there are other approaches that can be implemented using similar concepts. Particularly, variations on Approach 1-4, where the environmental disturbance is characterized by position offsets instead of ranging offsets, can also be employed. In which case the positioning accuracy is improved by correcting the positions estimated using timing measurements with position offsets retrieved from the environmental disturbance map 1104. In addition, the environmental disturbance can be characterized by the statistics of position errors or ranging errors; and the positioning accuracy is improved by taking advantage of these statistics in position estimation.

Note that it is possible that no environmental information can be retrieved from 1104 under certain conditions (for example, the timing measurements are obtained in an area which has not been visited previously by any mobile node 103), in which case the positioning is carried out using timing measurements only as in conventional systems.

The accuracy of the positioning algorithm 1102 also benefits from the environmental disturbance map 1104, and the past positions or position histories estimated by algorithm 1102 are used further for learning the environmental and improving the environmental disturbance map 1104. Therefore the positioning accuracy of the system increases progressively as the mobile nodes 405 move around in the application environment.

Example Implementation

The following describes an example implementation of the system. In the example implementation, an ADIS16488 MEMS IMU is used as the complementary sensor. Wireless devices operating in the 5.8 GHz ISM band with a bandwidth of 125 MHz are used to measure TOA based on round trip delay measurements. The real-time position is estimated using a Kalman filter (KF) that fuses the IMU measurements with the TOA measurements. Specifically, the position is computed based on the IMU readings in an Inertial Navigation System (INS).

The KF tracks the error states of the INS based on a linearized model. The TOA measurements are used as observations for updating the KF using a loosely coupled approach or a tightly coupled approach. Note that this is a technique for integrating IMU with time based positioning systems. However, due to the persistent presence of environmental disturbance, the performance of such a system can still be severely compromised. The reason is that the INS states (e.g., attitude, acceleration, biases of gyroscope and accelerometer measurements) are driven away from the correct values by biased TOA measurements through Kalman filter updating. It is well known that the positioning error of an INS increases rapidly with time if these underlying states are incorrect. Therefore, similar to the case in FIG. 13, the positioning accuracy can be significantly improved by using the history of timing measurements and history of the IMU measurements to estimate the position history or positions in the past.

In the example implementation, the KF is extended to a Biswas-Mahalanabis Fixed-Lag Smoother (BMFLS) (Grewal and Andrews 2014). At each time step t, the position of the object at a previous time step t' is estimated using all the available TOA measurements and IMU measurements up to time t, where t' is 10 seconds prior to t. The deleterious effect of the environmental disturbance is overcome and the achieved positioning accuracy is significantly higher than the real-time positioning algorithm based on KF.

FIG. 14 is a flow chart illustrating the operation of position estimation in the preferred implementation, which is in accordance with algorithm 1001 and 1002. The INS, KF and BMFLS are initialized in 1401. At each time step, if timing measurements are available, they are used in 1402 along with the environmental disturbance information retrieved from 1104 to update the KF. The updated KF state is then used to correct for the errors in the INS and thereby producing the real-time position estimate in 1403. The KF and INS are then propagated forward in time in 1404 using new IMU measurements. The BMFLS is subsequently updated in 1405 (some temporary results obtained in 1402 and 1404 are used), producing an estimate of the node position at a past time step which is used by algorithm 1003 to learn the environmental disturbance. If no timing measurements are available, the states of the INS, KF, and BMFLS are simply propagated forward in time using IMU measurements and the real-time position estimate is provided by the INS.

FIG. 15 is a flow chart 1500 illustrating using the environmental disturbance map to improve the positioning accuracy of a low-cost mobile node 406, which is in accordance with algorithm 1102. An estimated position of the mobile node is obtained in 1501 using the available timing measurements. The estimated position is used in 1502 for retrieving environmental disturbance from the environmental disturbance map 1104. The disturbance is then used along with the timing measurements to estimate the position in 1503. The estimated position is used again for retrieving environmental disturbance in 1502 and position estimation in 1503. This process is repeated until convergence, and the positioning accuracy is significantly improved.

FIG. 16 shows the environmental disturbance map 1004 in the preferred implementation, which is implemented as a look-up table. Each entry 1601-1603 in the table is indexed by a position in the application environment, which are referred to as reference point. To reduce the size of the table, a constraint is imposed so that the Euclidean distance between reference points is no less than a predetermined value. Each entry of the table stores the environmental disturbance at the corresponding reference point and the nearby area, which is characterized by the ranging offset associated with each timing measurement. Therefore each entry 1601-1603 in the look-up table 1104 contains a set of ranging offsets, and each offset corresponds to an anchor node. The disturbance at a specific position r is retrieved from the look-up table by searching for the closest reference point. If the Euclidean distance between the reference point and r is below a certain threshold, the corresponding entry in the look-up table will be retrieved and used for approximating the disturbance at r. Otherwise, it is deemed that no environmental information is available for the position r.

The environmental disturbance map 1004 is updated as follows. Firstly, the past positions estimated by the non-real-time positioning algorithm are used along with the known locations of anchor nodes to compute the estimated ranges, i.e., the distances between the estimated node positions and the anchor positions. The TOA measurements are converted to range measurements (which are subject to offsets due to environmental disturbance). The ranging offsets are then given by the differences between the range measurements and the estimated ranges. Denote by $\hat{r}\_t$ one of an estimated past positions and by $e\_t$ the estimated range offsets at $\hat{r}\_t$. When a new $\hat{r}\_t$ is available, it is first compared with the existing reference points in the look-up table. If the Euclidean distances between $\hat{r}\_t$ and all the existing reference points are great than a threshold $d\_TH$, a new entry indexed by $\hat{r}\_t$ will be inserted into the table, with the corresponding content set to $e\_t$. Otherwise, $e\_t$ is used to update and improve the entry corresponding to the reference point that is closest to $\hat{r}\_t$. Specifically, the ranging offsets at a reference point r are updated according to $$b\_(r,i) = (N\_(r,i) \times b\_(r,i) + e)/(N\_(r,i)+1)$$

where $N\_(r,i)$ denotes the number of recorded data associated with the reference point r for the i-th anchor node. e denotes the estimated ranging offset for the i-th anchor node.

FIG. 17 illustrates the disturbance in an indoor environment learned using the approach described in the preferred implementation. Shown in the diagram is the ranging offset associated the anchor node 401 at various reference positions.

Bibliography

Angelis, Alessio De, John Nilsson, Isaac Skog, Peter Händel, and Paolo Carbone. "Indoor Positioning by Ultra-wide Band Radio Aided Inertial Navigation." Metrology and Measurement Systems, 2010: 447-460.

Chan, Yiu-Tong, Wing-Yue Tsui, Hing-Cheung So, and Pak-Chung Ching. "Time-of-arrival based localization under NLOS conditions." IEEE Transactions on Vehicular Technology 55, no. 1 (January 2006): 17-24.

Godha, Saurabh. "Performance Evaluation of Low Cost MEMS-Based IMU Integrated With GPS for Land Vehicle Navigation Application." Msc Thesis, 2006.

Grewal, Mohinder S., and Angus P. Andrews. Kalman filtering: Theory and Practice with MATLAB. John Wiley & Sons, 2014.

Guvenc, Ismail, and Chia-Chin Chong. "A Survey on TOA Based Wireless Localization and NLOS Mitigation Techniques." IEEE Communications Surveys Tutorials 11, no. 3 (2009): 107-124.

Jourdan, Damien B., John J. Deyst, Moe Z. Win, and Nicholas Roy. "Monte Carlo Localization in Dense Multipath Environments Using UWB Ranging." 2005 IEEE International Conference on Ultra-Wideband. 2005. 314-319.

Karr, Charles, and Dennis Dupray. Wireless location using signal fingerprinting. Patent US20010022558A1. 2001.

Marano, Stefano, Wesley M. Gifford, Henk Wymeersch, and Moe Z. Win. "NLOS Identification and Mitigation for Localization Based on UWB Experimental Data." IEEE Journal on Selected Areas in Communications 28, no. 7 (September 2010): 1026-1035.

Sanderford, H. Britton, and Martin C. Poppe. Enhanced position calculation. U.S. Pat. No. 5,717,406A. 1998.

Shroff, Diniar S. Navigation System and Method of Obtaining Accurate Navigational Information in Signal Challenging Environments. Patent US20090265104A1. 2009.

Szabo, Andrei, Tobias Weiherer, and Joachim Bamberger. "Unsupervised learning of propagation time for indoor localization." 2011 IEEE 73rd Vehicular Technology Conference (VTC Spring). 2011. 1-5.

Tanigawa, Makoto, Jeroen D. Hol, Fred Dijkstra, Henk Luinge, and Per Slycke. "Augmentation of Low-cost GPS/MEMS INS with UWB Positioning System for Seamless Outdoor/Indoor Positionng." Proceedings of the 21st International Technical Meeting of the Satellite Division of The Institute of Navigation (ION GNSS 2008). Savannah, G A, 2008. 1804-1811.

Yang, Shao-Wen, Xue Yang, and Lei Yang. Simultaneous localization and mapping using spatial and temporal coherence for indoor location. Patent US20140295878A1. 2014.

Yin, Feng, Carsten Fritsche, Fredrik Gustafsson, and Abdelhak M. Zoubir. "EM- and JMAP-ML Based Joint Estimation Algorithms for Robust Wireless Geolocation in Mixed LOS/NLOS Environments." IEEE Transactions on Signal Processing 62, no. 1 (January 2014): 168-182.

There is provided a method for improving the accuracy of a wireless tracking system. The wireless tracking system comprises a location system based on wireless timing measurements between mobile and anchor nodes and one or more mobile nodes comprising one or more complementary sensors. The method comprises determining a location of mobile node(s) with complementary sensors in the past; storing a wireless disturbance map based on the determined location of mobile node(s) with complementary sensors in the past; and determining mobile node locations based on the wireless disturbance map to improve the accuracy of the mobile node locations.

There is provided 'method for determining an estimated location of a mobile device in a wireless tracking system. The wireless tracking system comprises a first mobile device, a second mobile device and multiple stationary devices at known locations. The method comprises for the first mobile device and for the first point in time determining a first estimated location and a second estimated location, wherein determining the first estimated location is based on multiple radio measurements and multiple sensor measurements of the first mobile device during a period of time after the first point in time and the second estimated location is based on a radio measurement at the first point in time and determining an error value indicative of a difference between the first estimated location and as second estimated location. The method further comprises for the second device receiving a radio measurement indicative of a second propagation time of radio frequency radiation between a second mobile device and the multiple stationary devices and determining an estimated location of the second mobile device based on the second radio measurement and the stored error value.

The following disclosure provide further mathematical detail on the methods described above. Upper and lower case boldface letters denote vectors and matrices, respectively. $(\bullet)^T$ represents the transpose operation. (xx) denotes the skew symmetric cross-product matrix of vector $x=[x_1, x_2, x_3]^T$, which is given by $$(x\times) = \begin{bmatrix} 0 & -x_3 & x_2 \\ x_3 & 0 & -x_1 \\ -x_2 & x_1 & 0 \end{bmatrix}. \quad (1)$$

In addition, |x| denotes the norm of vector x. $I_M$ and $0_{M\times N}$ denote a M-dimensional identity matrix and a zero matrix of M rows and N columns (the subscript is dropped if no ambiguity is introduced), respectively. $[x]_i$ denotes the i-th element of vector x. $[X]_{(i,j)}$ denotes the element of matrix X at row i, column j. $[X]_{(i,:)}$ and $[X]_{(i_1:i_2,j_1:j_2)}$ denote the i-th row of matrix X and a sub-matrix of X located between row $i_1$ column $j_1$ and row $i_2$ column $j_2$, respectively. $z \sim \mathcal{N}$ (m,S) means that z follows a Gaussian distribution with mean m and covariance S, while $\mathcal{N}$ (x;m,S) denotes the corresponding probability distribution function evaluated at x. $E(\bullet)$ denotes the expectation operation.

System Structure

Consider a positioning system comprising multiple anchor nodes at known positions and multiple mobile nodes. The ranges between the anchor nodes and each mobile node are measured for position estimation. One or more mobile nodes in the system are equipped with IMUs for improving the positioning performance. FIG. 18 shows the structure of these nodes. The position of the mobile node is computed in the INS using IMU readings and refined by the data fusion algorithm using range measurements, as is done in conventional integrated INS/IPS systems and integrated INS/GNSS systems. Specifically, a Kalman Filter (KF) operating on the error states of the INS is used in the fusion algorithm for real-time positioning. A data fusion scheme is used for the measurement update step of the KF, which supports non-Gaussian ranging error distributions at a low computational cost. Secondly, a location-dependent ranging error model is learned online based on past positions that are accurately estimated by a fixed-lag smoother, and used to improve the subsequent real-time tracking performance. It should be noted that the positioning and environment learning algorithms in FIG. 18 can be implemented in a centralized or distributed fashion (and certain communication means may be required for information sharing among the nodes, which is beyond the scope of this paper). The following describes the two key features of the proposed system in detail.

Data Fusion Scheme for Non-Gaussian Ranging Error Distribution

In some systems the KF is updated based on a linear observation model of position (loosely-coupled) or a linearized observation model of ranges (tightly-coupled), both of which assume that the observation error is Gaussian distributed. While this assumption is valid under LOS conditions (e.g., in GPS systems and others that operate in outdoor environments), it may not hold in indoor applications since the ranging error distributions are non-Gaussian due to multipath propagation. One can still use approximate Gaussian error distributions in the system, but the positioning accuracy will be compromised. Using a particle filter allows the use of non-Gaussian distributions, but will incur an intolerably high computational complexity since there could be as many as 15 states in the filter.

Frame Definition and Measurement Model

We define the following Cartesian coordinate frames:

B-Frame: Body frame that is fixed to the IMU, with axes parallel to those of the triaxial gyroscope and accelerometer.

N-Frame: North-East-Down (NED) frame with the X, Y, and Z axis pointing north, east, and down respectively.

Throughout this paper, vectors described in B-Frame and N-Frame are denoted with superscripts $^B$ and $^N$, respectively. In addition, we use a Direction Cosine Matrix (DCM[?]) $C_B^N$ to represent the attitude of the B-Frame with respect to the N-Frame. At each time step k, the outputs of the IMU are given by $$\tilde{w}_k^B = w_k^B + b_{\omega,k}^B + z_{\omega,k}, \quad (2)$$

$$\tilde{a}_k^B = a_k^B + b_{a,k}^B + z_{a,k}, \quad (3)$$

where $\tilde{w}_k^B$ ($w_k^B$) and $\tilde{a}_k^B$ ($a_k^B$) denote the measured (true) angular rate and acceleration, respectively. $z_{\omega,k}$ and $Z_{a,k}$ are measurement noises, $z_{\omega,k} \sim \mathcal{N}$ ($0_{3\times1}$, $\sigma_{\omega,z}^2 I$), $Z_{a,k} \sim \mathcal{N}$ ($0_{3\times1}$, $\sigma_{a,z}^2 I$). $b_{\omega,k}^B$ and $b_{a,k}^B$ denote the measurement biases, which are modeled by random walk processes as below $$b_{\omega,k+1}^B = b_{\omega,k}^B + h_{\omega,k}, \quad (4)$$

$$b_{a,k+1}^B = b_{a,k}^B + h_{a,k}, \quad (5)$$

where $h_{\omega,k} \sim \mathcal{N}$ ($0_{3\times1}$, $\sigma_{\omega,b}^2 I$), $h_{a,k} \sim \mathcal{N}$ ($0_{3\times1}$, $\sigma_{a,b}^2 I$).

The range measurements at time step k, if available, are denoted by $$\tilde{d}_{k,i} = |r_k^N - r_i| + \xi_{k,i}, (i=1, \ldots, A), \quad (6)$$

where A is the number of anchor nodes, $r_i$ denotes the position of the i-th anchor node. $\xi_{k,i}$ denotes the associated ranging error, which is non-Gaussian distributed due to multipath propagation and generally biased due to NLOS error.

Integrated INS/IPS Based on Error State KF

The states of the mobile node are computed in the INS as follows based on IMU measurements:

$$(\hat{C}_{B,k+1}^N, \hat{v}_{k+1}^N, \hat{r}_{k+1}^N) = f_{INS}(\hat{C}_{B,k}^N, \hat{v}_k^N, r_k^N, \tilde{w}_k^B, \tilde{a}_k^B, \hat{b}_{\omega,k}^B, \hat{b}_{a,k}^B), \quad (7)$$

where $\hat{C}_{B,k}^N$, $\hat{v}_k^N$, and $\hat{r}_k^N$ denote the estimated attitude, velocity, and position of the node at time step k, respectively, while $\hat{b}_{\omega,k}^B$ and $\hat{b}_{a,k}^B$ denote the estimated gyroscope bias and accelerometer bias, respectively. $f_{INS}(\bullet)$ denotes the operations used for computing the node state. For completeness, an implementation of $f_{INS}(\bullet)$ for low-cost IMUs is further below.

A KF is employed for data fusion in the integrated INS/IPS system, as is done in conventional integrated INS/IPS systems and integrated INS/GNSS systems. Specifically, the error states of the INS are tracked in the KF based on a linearized model and updated using range measurements. The state of the KF is defined as $$\delta x_k = \begin{bmatrix} \delta y \\ \delta v^N \\ \delta r^N \\ \delta b_\omega^B \\ \delta b_a^B \end{bmatrix}_k \triangleq \begin{bmatrix} \delta y_k \\ \hat{v}_k^N - v_k^N \\ \hat{r}_k^N - r_k^N \\ \hat{b}_{\omega,k}^B - b_{\omega,k}^B \\ \hat{b}_{a,k}^B - b_{a,k}^B \end{bmatrix}, \quad (8)$$

where $v_k^N$ and $r_k N$ denote the true velocity and position at time step k, respectively. $\delta y_k$ is the Psi-angle error for characterizing the attitude error, which is defined as below $$C_{B,k}{}^N = C(\delta y_k) \hat{C}_{B,k}{}^N, \quad (9)$$

where $C_{B,k}{}^N$ denotes the true attitude at time step k, C(•) is defined as in (40).

The transition model for the error state KF at each time step is given by $$\delta x_{k+1} = A_k \delta x_k + B_k w_k, \quad (10)$$

where $A_k$, $B_k$, and $w_k$ are defined by (45), (46), and (47) respectively in Appendix 7.0.2.

The measured wireless ranges $\tilde{d}_{k,i}$ (see (6)) are used for measurement update in the KF. Conventional approaches are based on the loosely-coupled scheme or tightly-coupled scheme, where linearized observation models of the error state $\delta x_k$ are generated based on differences between the predicted position and that estimated from $\tilde{d}_{k,i}$ (loosely-coupled scheme) or differences between the predicted ranges and $\tilde{d}_{k,i}$ (tightly-coupled scheme). In either cases, the position error or the ranging errors are assumed to be Gaussian distributed [?, ?, ?]. However, this assumption does not hold in indoor environments and therefore compromises the positioning accuracy, as discussed in Section 2.1.

Proposed Data Fusion Scheme

In this section, we propose a novel data fusion scheme for updating the KF described above, which is based on pseudo position measurements and supports non-Gaussian ranging error distributions.

Consider a simplified KF model as below $$x_k = A_k x_{k-1} + w_k, \quad (11)$$

$$z_k = x_k + x_k, \quad (12)$$

where $x_k \sim \mathcal{N}(0,R)$. Denote by $m_{k|k-1}$ ($S_{k|k-1}$) and $m_{k|k}$ ($S_{k|k}$) the mean (covariance) of the KF state before and after the measurement update respectively. In other words, the prior and posterior distribution of $x_k$ are given by $\mathcal{N}(m_{k|k-1}, S_{k|k-1})$ and $\mathcal{N}(m_{k|k}, S_{k|k})$ respectively. It can be easily verified that $$S_{k|k} = [S_{k|k-1}{}^{-1} + R^{-1}]^{-1}, \quad (13)$$

$$m_{k|k} = S_{k|k}(S_{k|k-1}{}^{-1} m_{k|k-1} + R^{-1} z_k), \quad (14)$$

which shows that the posterior distribution $\mathcal{N}(m_{k|k}, S_{k|k})$ is given by the product of $\mathcal{N}(m_{k|k-1}, S_{k|k-1})$ and $\mathcal{N}(z_k, R)$. This can be interpreted in the context of a probabilistic graphical model [?] by considering $\mathcal{N}(z_k, R)$ as a "message" for refining the prior distribution $\mathcal{N}(m_{k|k-1}, S_{k|k-1})$.

Similarly, the position estimated in an integrated INS/IPS is obtained by multiplying the "message" from the INS (which is a Gaussian distribution and corresponds to the prior distribution in the simplified KF model above) and those from range measurements. The resulting distribution can be fitted to a Gaussian model for an approximate posterior distribution, which corresponds to $\mathcal{N}(m_{k|k}, S_{k|k})$ in the simplified KF model above. Substituting $(m_{k|k}, S_{k|k})$ and $(m_{k|k-1}, S_{k|k})$ into (13)-(14) and solving for $z_k$ and R, one can obtain a pseudo position measurement $z_k$ with covariance R. Particularly, when $z_k$ and R are used for measurement update in the KF model defined by (8) and (10), a posterior position distribution is produced that is identical to the approximate Gaussian position distribution obtained from the combined "messages" from the INS and range measurements. This increases the positioning accuracy without incurring significant computational complexity (note that the complexity of a particle filter is intolerably high due to the high dimensionality of $\delta x_k$).

The proposed positioning algorithm for integrated INS/IPS with non-Gaussian ranging error distributions is summarized in Algorithm 1 in FIG. 19, where $P_k$ denotes the covariance of $\delta x_k$, i.e., $P_k = E[\delta x_k \delta x_k^T]$. For the algorithm to operate, the state of the mobile node (particularly, the attitude) needs to be initialized properly (initial alignment). The alignment algorithm used in this paper is given in Appendix 8.

Self-calibrating Indoor Positioning System for NLOS Environments

The performance of the integrated INS/IPS using the data fusion scheme is significantly improved over those using conventional approaches. However, the positioning accuracy is still severely compromised due to the presence of NLOS errors and the fact that the ranging error distribution varies with positions in indoor environments. To address this issue, we extend Algorithm 1 and propose a self-calibrating indoor positioning system in this section. Specifically, the KF in Algorithm 1 is extend to Bayesian smoothers, resulting in non-real-time positioning algorithms that significantly improve the positioning accuracy. The estimated positions are then utilized to learn the application environment, and the subsequent real-time positioning accuracy are improved using the learning result.

Location-dependent Ranging Error Model

We first propose a location-dependent ranging error model to characterize the application environment. Define M reference points in the application environment, with the position of each point denoted by $c_m$, (m=1, . . . ,M). Each reference point is associated with a probability distribution to characterize the ranging error distribution in the vicinity, which is learned online using estimated past positions of the mobile node. Specifically, we use the Laplace distribution in this paper since it has been previously shown to be an accurate model for the range error distribution in indoor environments. Accordingly, the ranging error distribution associated with the m-th reference point for the i-th anchor node is given by $$p_{m,i}(e) = \frac{1}{2\lambda_{m,i}} e^{-\frac{1}{\lambda_{m,i}}|e - b_{m,i}|}, \quad (27)$$

where $b_{m,i}$ corresponds to the NLOS error (i.e., ranging bias), $\lambda_{m,i}$ characterizes the intensity of ranging noise. The ranging error distribution at an arbitrary location r is then given as below according to the Nearest Neighbor criterion:

$$n = \arg\min_m |r - c_m|, \quad (28)$$

$$p_{r,i}(e) = \begin{cases} p_{n,i}(e) & \text{if } |r - c_n| \leq d_{TH} \\ p(e) & \text{otherwise} \end{cases}, \quad (29)$$

where p(e) denotes a general ranging error model for the application environment, $d_{TH}$ controls the area covered by each reference point.

Non-real-time Position Estimation

The KF in Algorithm 1 can be extended to a Biswas-Mahalanabis Fixed-Lag Smoother (BMFLS) or a Rauch-Tung-Striebel (RTS) smoother, resulting in a delayed or an offline positioning algorithm, respectively. Since the mobile position at certain time step is estimated using both the past and future measurements, the positioning accuracy is significantly improved over Algorithm 1 as will be shown below. We use BMFLS in the proposed system to facilitate online learning of the application environment.

Complexity Reduction

The KF in Algorithm 1 operates at the same rate as that of IMU measurements (i.e., (26) is executed each time a new IMU measurement is available). A BMFLS extended directly from this KF exhibits high computational complexity, since the BMFLS operates on an augmented state vector. For example, the past 1000 KF states are maintained in a BMFLS with 10 s lag if the INS output rate is 100 Hz. To address this issue, the BMFLS in the proposed system operates at the same rate as that of wireless range measurements, as will be shown in Algorithm 2 in FIG. 20. Since the range measurement rate is significantly lower than the IMU output rate in typically systems, the dimension of the BMFLS (and thus the computational complexity) is significantly reduced.

Online Learning

The location-dependent ranging error model described above is learned online based on delayed positions estimated by the algorithm above. The learning algorithm used in the proposed system is given in Algorithm 3 in FIG. 21. Specifically, the reference points $c_m$ (see (28) and (29), also denoted as $X_m$) are generated from estimated positions in Step 1-2, where $d_{TH}$ controls the density of reference points. The ranging error model $p_{m,i}(e)$ at each reference point is estimated in Step 3 using ranges measured in the neighbourhood. Note that (30)-(31) is a heuristic method for estimating the parameters of a Laplace distribution. $b_{m,i}$ and $\lambda_{m,i}$ approach the true values as the number of samples $(N_{m,i})$ increases.

Once the ranging error distribution associated with a reference point is learned, the real-time positioning accuracy of any mobile node that is in the vicinity of the reference point subsequently can be improved using the learning result.

Figure 1:
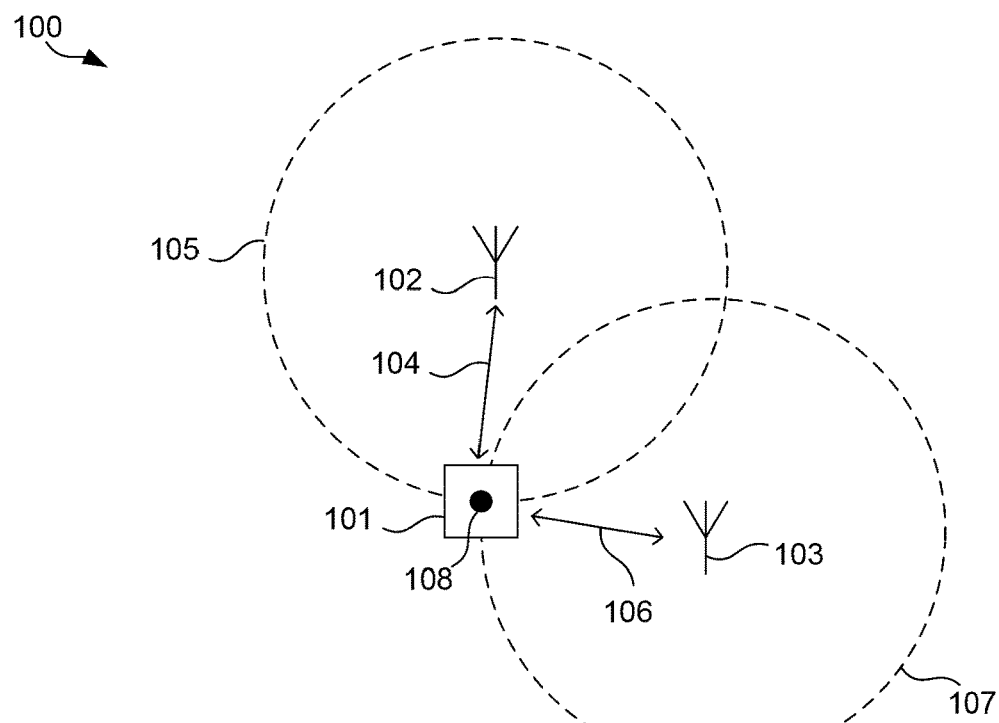
FIG. 1 illustrates a prior art system comprising a mobile device, a first stationary device and a second stationary device.
Figure 2:
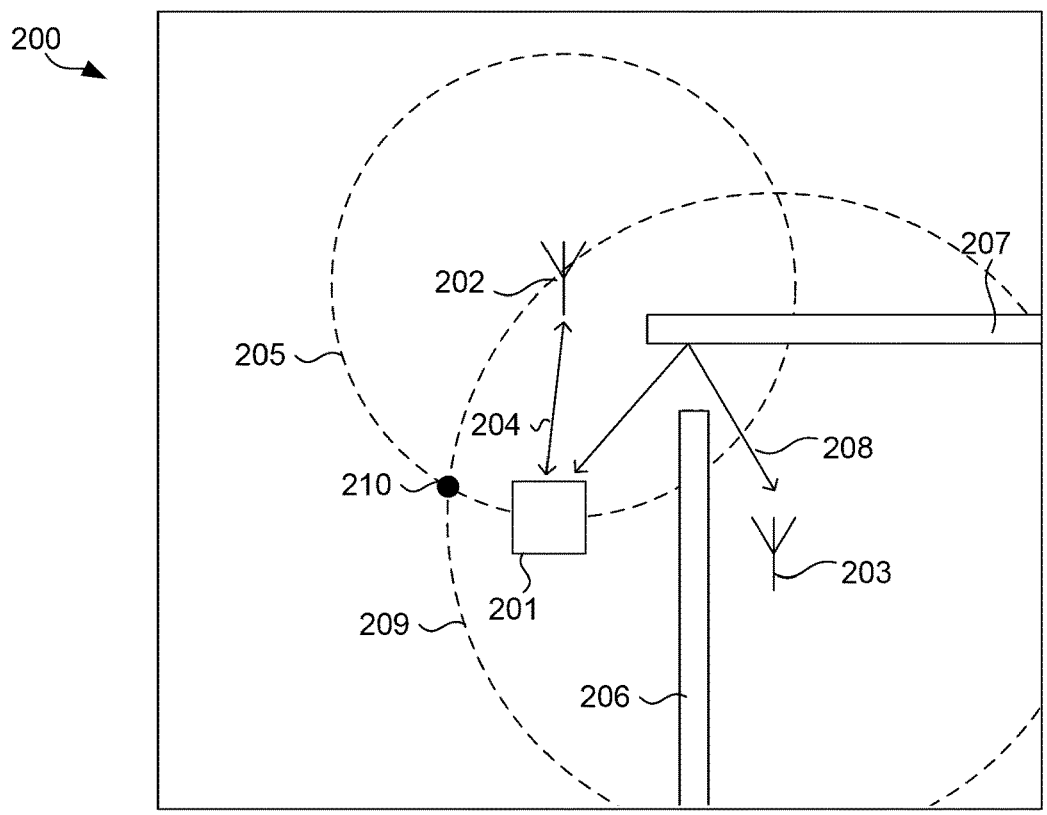
FIG. 2 illustrates an indoor scenario according to the prior art.

The operation of the proposed self-calibrating indoor positioning system is summarized in Algorithm 4 in FIG. 22 where T serves the purpose of reducing the operation rate of the BMFLS. Note that the location-dependent ranging error model learned online in Step 7 is used in Step 2, as is shown by FIG. 1.

As is described above, the Algorithms can be implemented in a centralized or distributed fashion, and the learned location-dependent ranging error model can be used by any mobile nodes in the system (which may not be equipped with IMUs) for accuracy improvement.

The proposed system can be considered as an indoor counterpart of the Differential GPS (DGPS) system, with the biases (NLOS errors) corrected using information provided by a group of reference points. From another perspective, it is a hybrid fingerprint-based and range-based system, which combines the advantages of both technologies. Specifically, the proposed system achieves higher accuracy than a range-based system because the ranging error statics (particularly the NLOS errors) in the application environment is learned. On the other hand, the learning process in the proposed system is automatic and labour free compared with the surveying process in fingerprint-based systems.

EXAMPLES

We use the wireless ad hoc system for positioning (WASP) developed at the Commonwealth Scientific and Industrial Research Organisation (CSIRO) of Australia for our experiments. The WASP platform was designed with low-cost off-the-shelf hardware and operates in the 5.8 GHz ISM band. The system utilizes a bandwidth of 125 MHz for range measurements based on time-of-arrival (TOA). The WASP nodes form a multi-hop ad-hoc network based on a time division multiple access (TDMA) MAC layer protocol, which supports high-rate range measurements between each pair of nodes in the system. The system has been extensively tested and commercially applied in athlete tracking and underground mining. The devices may be equipped with an Analog Device ADIS16488 Micro-Electro-Mechanical Systems (MEMS) IMU. The experiments were conducted in and around our office building, the floorplan of which is shown in FIG. 23. There are many walls in the area, resulting in predominantly NLOS conditions and substantial multipath reflections. A group of WASP nodes were deployed at known locations of the building as anchors. A WASP node equipped with an IMU was used as a mobile node and carried by a person walking around the building. The output rate of the IMU was configured to be 102.5 Hz $$\left(\text{i.e.,}\ \frac{1}{\Delta t} = 102.5\right),$$

while the ranges were measured at a rate of 10 Hz. The data was recorded and processed offline[1] using Matlab.

[1] WASP can also process the ranging data online for real-time positioning/tracking.

The following algorithms may be used

KF-Tight: An Algorithm using a tightly-coupled fusion scheme [?]. The ranging error variance (i.e., $E(\xi_{k,i}^2)$) is estimated online based on the 10 latest range measurements to improve the performance.

KF-Proposed: An Algorithm with observation model generated by the Algorithm above. The following ranging error distribution is used for the experimental environment $$p_{k,i}(x) = \begin{cases} \dfrac{1}{\lambda_P + \lambda_N} e^{\frac{x}{\lambda_N}} & x \leq 0 \\ \dfrac{1}{\lambda_P + \lambda_N} e^{-\frac{x}{\lambda_P}} & x \geq 0 \end{cases}, \quad (36)$$

which is derived from ranging data between anchors, with $\lambda_N=0.6$, $\lambda_P=2.03$.

RTS-Proposed: Similar to KF-Proposed, with the KF extended to a RTS smoother.

FLS-Proposed: Similar to KF-Proposed, with the KF extended directly to a BMFLS. The lag was set to three seconds unless otherwise specified.

SelfCal-Proposesd: The self-calibrating positioning algorithm provided herein, where the lag of BMFLS was 10 s.

Note that the ranging error $\xi_{k,i}$ (see (6)) is assumed to be Gaussian distributed in the conventional algorithms (i.e., LS, Robust-LS, and KF-tight), while the remaining algorithms are based on non-Gaussian ranging error models. RTS-Proposed and FLS-Proposed are non-real-time positioning algorithms where the node position is estimated using both the past and future measurements. SelfCal-Proposesd further takes advantage of the outputs of non-real-time positioning algorithms and learns the application environment to improve the subsequent real-time tracking performance. Wherever applied, the number of particles and the convergence threshold are set to N=1000 and ε=0.01, respectively, and the default ranging noise intensity is set to $\lambda_0=2$.

Equations and Definitions for Integrated INS/IPS

State Computation

To compute the states of the mobile node using IMU readings, the bias in $\tilde{w}_k^B$ is first corrected by $$\hat{w}_k^B = \tilde{w}_k^B - \hat{b}_{\omega,k}^B. \tag{37}$$

Integrating $\hat{w}_k^B$ between time step k and k+1 results in a rotation vector [?] $f_k$, which is used to compute the attitude. Specifically, defining $$f_k = \int_{t_k}^{t_{k+1}} \hat{w}_k^B dt \approx \hat{w}_k^B \Delta t, \tag{38}$$

where $\Delta t \triangleq t_{k+1} - t_k$ is the interval between time step k and k+1, the attitude is computed by $$\hat{C}_{B,k+1}^N = \hat{C}_{B,k}^N C(f_k), \tag{39}$$

where $C(f_k)$ denotes the DCM corresponding to $f_k$, which can be obtained according to (40) as below[?], $$C(f) = I + \frac{\sin|f|}{|f|}(f\times) + \frac{1-\cos|f|}{|f|^2}(f\times)(f\times). \tag{40}$$

$\hat{a}_k^B$ is then transformed from B-Frame into N-Frame using the estimated attitude $C_{B,k}^N$ $$\hat{a}_k^N = c_{B,k}^N \hat{a}_k^B, \tag{41}$$

where $\hat{a}_k^B$ denotes the B-Frame acceleration after bias correction, i.e., $$\hat{a}_k^B = \tilde{a}_k^B - \hat{b}_{a,k}^B. \tag{42}$$

Given $\hat{a}_k^N$, the velocity and position is then computed according to $$\hat{v}_{k+1}^N = \hat{v}_k^N + (\hat{a}_k^N + [0,0,G]^T)\Delta t, \tag{43}$$

$$\hat{r}_{k+1}^N = \hat{r}_k^N + \hat{v}_k^N \Delta t, \tag{44}$$

where G denotes the gravitational acceleration.

Transition Model of the KF

The variables in the error state transition model (10) are given by:

$$A_k = I + \begin{bmatrix} 0 & 0 & 0 & \hat{C}_{B,k}^N & 0 \\ (\hat{C}_{B,k}^N \hat{a}_k^B)\times & 0 & 0 & 0 & -\hat{C}_{B,k}^N \\ 0 & I & 0 & 0 & 0 \\ 0 & 0 & 0 & 0 & 0 \\ 0 & 0 & 0 & 0 & 0 \end{bmatrix} \Delta t, \tag{45}$$

$$B_k = \begin{bmatrix} -\hat{C}_{B,k}^N & 0 & 0 & 0 \\ 0 & \hat{C}_{B,k}^N & 0 & 0 \\ 0 & 0 & 0 & 0 \\ 0 & 0 & I & 0 \\ 0 & 0 & 0 & I \end{bmatrix} \Delta t, \tag{46}$$

$$w_k = \begin{bmatrix} z_{\omega,k} \\ z_{a,k} \\ h_{\omega,k} \\ h_{a,k} \end{bmatrix}, \tag{47}$$

where $\hat{C}_{B,k}^N$, $\hat{a}_k^B$, and $\Delta t$ are given as in (39), (42), and (38), respectively. The elements in $w_k$ are defined in (2)-(5).

Initial Alignment of INS

In this disclosure, the initial alignment is carried out by keeping the IMU static for a short period before putting the system into operation. The initial velocity is thus set to $\hat{v}_0^N=0$, while the initial position $\hat{r}_0^N$ can be estimated using range measurements or assume the coordinates of the starting point. Denote the average angular rate and acceleration measured in the static period as $\overline{w}^B$ and $\overline{a}^B$, respectively. The gyroscope bias is initialized to be $\hat{b}_{\omega,0}^B = \overline{w}^B$. The initial accelerometer bias $\hat{b}_{a,0}^B$ is set to zeros since it cannot be determined from $\overline{a}^B$ alone. To estimate the initial attitude, we resort to an Euler angle[?] attitude representation. The pitch angle is given by $$\theta = \sin^{-1}\left(\frac{1}{G}[\overline{a}^B]_1\right),$$

while the roll angle $\phi$ satisfies $$\sin\phi = -\frac{1}{G\cos\theta}[\overline{a}^B]_2,$$

$$\cos\phi = -\frac{1}{G\cos\theta}[\overline{a}^B]_3.$$

The heading angle $\psi$ can be easily estimated by visual inspection. Given θ, φ, and ψ, the initial attitude $\hat{C}_{B,0}^N$ can be computed.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

The invention claimed is:

1. A method for determining an estimated location of a mobile device in a wireless tracking system, the wireless tracking system comprising a first mobile device equipped with a complementary sensor, a second mobile device and multiple stationary devices at known locations in an application environment, the method comprising:

learning disturbances in the application environment by:
receiving a first radio measurement indicative of a first propagation path length of radio frequency radiation between the first mobile device equipped with the complementary sensor and the multiple stationary devices;
receiving complementary sensor data captured by the complementary sensor and indicative of movement of the first mobile device, wherein the complementary sensor data is of a type different to the first radio measurement;
determining a historical location of the first mobile device equipped with the complementary sensor based on the first radio measurement and the complementary sensor data;
determining error data indicative of a difference between (i) a historical radio measurement associated with the historical location and (ii) the historical location determined based on the complementary sensor data; and
storing the error data associated with the historical location on a data store; and
using the learned disturbances as stored in the error data to improve positioning of the second mobile device without the complementary sensor data by:
receiving a second radio measurement indicative of a second propagation path length of radio frequency radiation between the second mobile device and the multiple stationary devices; and
determining an estimated location of the second mobile device based on the second radio measurement and the error data.

2. The method of claim 1, wherein receiving the complementary sensor data comprises receiving sensor data from one or more inertial sensors.

3. The method of claim 1, wherein receiving the complementary sensor data comprises receiving sensor data from one or more of:
a video camera;
a laser range finder; and
a radar.

4. The method of claim 1, wherein determining the historical location comprises using a smoother.

5. The method of claim 4, wherein the smoother is one or more of:
a Bayesian smoother;
a fixed length smoother;
a Rauch-Tung-Striebel smoother; and
a particle filter.

6. The method of claim 1, wherein the first radio measurement and the complementary sensor data are associated with time t, the historical location is associated with t' and t' is earlier than t.

7. The method of claim 6, wherein determining the historical location is based on further radio measurements and further sensor data associated with t" and t" is earlier than t'.

8. The method of claim 1, wherein determining the estimated location of the second mobile device based on the error data comprises querying the error data for a query location to retrieve an error value associated with the query location.

9. The method of claim 1, wherein the error data is indicative of a range offset to one of the multiple stationary devices.

10. The method of claim 1, wherein the error data is indicative of an offset of a position of the second mobile device.

11. The method of claim 1, wherein the error data comprises parameters of a parameterised representation of the error data over a space in which the first mobile device and second mobile device are located.

12. The method of claim 1, wherein a sampling rate of historical locations is less than a sampling rate of the complementary sensor data.

13. A non-transitory, computer readable medium with instruction code stored thereon that, when executed by a computer, causes the computer to perform the method of claim 1.

14. A system for determining an estimated location of a mobile device in a wireless tracking system, the wireless tracking system comprising a first mobile device equipped with a complementary sensor, a second mobile device and multiple stationary devices at known locations in an application environment, the system comprising:
an input port
to receive a first radio measurement indicative of a first propagation path length of radio frequency radiation between the first mobile device equipped with a complementary sensor and the multiple stationary devices, and
to receive complementary sensor data captured by the complementary sensor and indicative of movement of the first mobile device, wherein the complementary sensor data is of a type different to the first radio measurement; and
a processor, the processor being configured to learn disturbances in the application environment by:
determining a historical location of the first mobile device equipped with the complementary sensor based on the first radio measurement and the complementary sensor data;
determining error data indicative of a difference between (i) a historical radio measurement associated with the historical location and (ii) the historical location determined based on the complementary sensor data;
storing the error data associated with the historical location on a data store;
the processor further being configured to use learned disturbances as stored in the error data to improve positioning of the second mobile device without the complementary sensor data by:
receiving a second radio measurement indicative of a second propagation path length of radio frequency radiation between the second mobile device and the multiple stationary devices; and
determining an estimated location of the second mobile device based on the second radio measurement and the error data.

15. A method for determining an estimated location of a mobile device as performed by a location server in a wireless tracking system, the wireless tracking system comprising a first mobile device equipped with a complementary sensor, a second mobile device and multiple stationary devices at known locations in an application environment, the method comprising:
learning disturbances in the application environment by:
receiving a first radio measurement indicative of a first propagation path length of radio frequency radiation between the first mobile device equipped with the complementary sensor and the multiple stationary devices;
receiving complementary sensor data captured by the complementary sensor and indicative of movement of the first mobile device, wherein the complementary sensor data is of a type different to the first radio measurement;

determining a historical location of the first mobile device equipped with the complementary sensor based on the first radio measurement and the complementary sensor data;

determining error data indicative of a difference between (i) a historical radio measurement associated with the historical location and (ii) the historical location determined based on the complementary sensor data; and sending the error data associated with the historical location to the second mobile device to allow the second mobile device to use the learned disturbances as stored in the error data to improve positioning of the second mobile device without the complementary sensor data by determining an estimated location of the second mobile device based on the error data and a second radio measurement indicative of a second propagation path length of radio frequency radiation between the second mobile device and the multiple stationary devices.

16. A non-transitory, computer readable medium with instruction code stored thereon that, when executed by a computer, causes the computer to perform the method of claim 15.

17. A location server for determining an estimated location of a mobile device in a wireless tracking system, the wireless tracking system comprising a first mobile device equipped with a complementary sensor, a second mobile device and multiple stationary devices at known locations in an application environment, the location server comprising:

an input port
to receive a first radio measurement indicative of a first propagation path length of radio frequency radiation between the first mobile device and the multiple stationary devices; and
to receive complementary sensor data captured by the complementary sensor and indicative of movement of the first mobile device, wherein the complementary sensor data is of a type different to the first radio measurement;

a processor, the processor being configured to learn disturbances in the application environment by:
determining a historical location of the first mobile device equipped with the complementary sensor based on the first radio measurement and the complementary sensor data;
determining error data indicative of a difference between (i) a historical radio measurement associated with the historical location and (ii) the historical location determined based on the complementary sensor data; and an output port to send the error data associated with the historical location to the second mobile device to allow the second mobile device to use learned disturbances as stored in the error data to improve positioning of the second mobile device without the complementary sensor data by determining an estimated location of the second mobile device based on the error data and a second radio measurement indicative of a second propagation path length of radio frequency radiation between the second mobile device and the multiple stationary devices.

18. A method for determining an estimated location of a second mobile device as performed by the second mobile device in a wireless tracking system, the wireless tracking system comprising a first mobile device equipped with a complementary sensor, the second mobile device and multiple stationary devices at known locations in an application environment, the method comprising:

receiving error data associated with a historical location of a first device, the error data representing learned disturbances in the application environment by being indicative of a difference between (i) a historical radio measurement associated with the historical location indicative of a first propagation path length of radio frequency radiation between the first mobile device and the multiple stationary devices and (ii) the historical location of the first mobile device determined based on the historical radio measurement and complementary sensor data captured by the complementary sensor and indicative of movement of the first mobile device, wherein the complementary sensor data is of a type different to the historical radio measurement;

using the learned disturbances as stored in the error data to improve positioning of the second mobile device without the complementary sensor data by receiving a second radio measurement indicative of a second propagation path length of radio frequency radiation between a second mobile device and the multiple stationary devices; and determining an estimated location of the second mobile device based on the second radio measurement and the error data.

19. A non-transitory, computer readable medium with instruction code stored thereon that, when executed by a computer, causes the computer to perform the method of claim 18.

20. A second mobile device for determining an estimated location of the second mobile device in a wireless tracking system, the wireless tracking system comprising a first mobile device equipped with a complementary sensor, the second mobile device and multiple stationary devices at known locations in an application environment, the second mobile device comprising:

a first input port to receive error data associated with a historical location of a first device, the error data representing learned disturbances in the application environment by being indicative of a difference between (i) a historical radio measurement associated with the historical location indicative of a first propagation path length of radio frequency radiation between the first mobile device and the multiple stationary devices and (ii) the historical location of the first mobile device determined based on the historical radio measurement and complementary sensor data captured by the complementary sensor and indicative of movement of the first mobile device, wherein the complementary sensor data is of a type different to the historical radio measurement;

a second input port to receive a second radio measurement indicative of a second propagation path length of radio frequency radiation between the second mobile device and the multiple stationary devices; and a processor to use the learned disturbances as stored in the error data to improve positioning of the second mobile device without the complementary sensor data by determining an estimated location of the second mobile device based on the second radio measurement and the error data.

* * * * *